(12) United States Patent
Poupyrev et al.

(10) Patent No.: US 9,971,415 B2
(45) Date of Patent: May 15, 2018

(54) RADAR-BASED GESTURE-RECOGNITION THROUGH A WEARABLE DEVICE

(71) Applicant: Google Inc., Mountain View, CA (US)

(72) Inventors: Ivan Poupyrev, Sunnyvale, CA (US); Gaetano Roberto Aiello, Bend, OR (US)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 15/403,066

(22) Filed: Jan. 10, 2017

(65) Prior Publication Data

US 2017/0192522 A1 Jul. 6, 2017

Related U.S. Application Data

(63) Continuation of application No. 14/312,486, filed on Jun. 23, 2014, now Pat. No. 9,575,560.

(60) Provisional application No. 62/007,324, filed on Jun. 3, 2014.

(51) Int. Cl.

| G06F 3/01 | (2006.01) |
|---|---|
| G01S 7/41 | (2006.01) |
| G01S 13/89 | (2006.01) |
| G06F 1/16 | (2006.01) |
| G01S 13/88 | (2006.01) |

(52) U.S. Cl.
CPC .............. *G06F 3/017* (2013.01); *G01S 7/411* (2013.01); *G01S 13/88* (2013.01); *G01S 13/89* (2013.01); *G06F 3/014* (2013.01); *G06F 1/163* (2013.01)

(58) Field of Classification Search
CPC ........ G06F 3/014; G06F 3/017; G06F 3/0488; G06F 1/163; G01S 7/411; G01S 13/89; G01S 13/88; H04W 4/008
See application file for complete search history.

(56) References Cited

U.S. PATENT DOCUMENTS

| 3,610,874 A | 10/1971 | Gagliano |
|---|---|---|
| 3,953,706 A | 4/1976 | Harris et al. |
| 4,654,967 A | 4/1987 | Thenner |

(Continued)

FOREIGN PATENT DOCUMENTS

| CN | 202887794 | 4/2013 |
|---|---|---|
| CN | 103355860 | 1/2016 |

(Continued)

OTHER PUBLICATIONS

"Cardiio", Retrieved from: <http://www.cardiio.com/> Apr. 15, 2015 App Information Retrieved From: <https://itunes.apple.com/us/app/cardiio-touchless-camera-pulse/id542891434?ls=1&mt=8> Apr. 15, 2015, Feb. 24, 2015, 6 pages.

(Continued)

*Primary Examiner* — Darlene M Ritchie
(74) *Attorney, Agent, or Firm* — Colby Nipper

(57) ABSTRACT

This document describes techniques and devices for radar-based gesture-recognition through a wearable device. The techniques enable an easy-to-use input interface through this wearable radar device, in contrast to small or difficult-to-use input interfaces common to wearable computing devices. Further, these techniques are not limited to interfacing with wearable computing devices, but may aid users in controlling various non-wearable devices, such as to control volume on a stereo, pause a movie playing on a television, or select a webpage on a desktop computer.

20 Claims, 14 Drawing Sheets

(56) References Cited

U.S. PATENT DOCUMENTS

| | | |
|---|---|---|
| 4,700,044 A | 10/1987 | Hokanson et al. |
| 4,795,998 A | 1/1989 | Dunbar et al. |
| 5,298,715 A | 3/1994 | Chalco et al. |
| 5,341,979 A | 8/1994 | Gupta |
| 5,798,798 A | 8/1998 | Rector et al. |
| 6,032,450 A | 3/2000 | Blum |
| 6,080,690 A | 6/2000 | Lebby et al. |
| 6,210,771 B1 | 4/2001 | Post et al. |
| 6,313,825 B1 | 11/2001 | Gilbert |
| 6,340,979 B1 | 1/2002 | Beaton et al. |
| 6,386,757 B1 | 5/2002 | Konno |
| 6,492,980 B2 | 12/2002 | Sandbach |
| 6,493,933 B1 | 12/2002 | Post et al. |
| 6,513,970 B1 | 2/2003 | Tabata et al. |
| 6,543,668 B1 | 4/2003 | Fujii et al. |
| 7,164,820 B2 | 1/2007 | Eves et al. |
| 7,299,964 B2 | 11/2007 | Jayaraman et al. |
| 7,317,416 B2 | 1/2008 | Flom et al. |
| 7,348,285 B2 | 3/2008 | Dhawan et al. |
| 7,365,031 B2 | 4/2008 | Swallow et al. |
| 7,421,061 B2 | 9/2008 | Boese et al. |
| 7,528,082 B2 | 5/2009 | Krans et al. |
| 7,544,627 B2 | 6/2009 | Tao et al. |
| 7,578,195 B2 | 8/2009 | DeAngelis et al. |
| 7,677,729 B2 | 3/2010 | Vilser et al. |
| 7,691,067 B2 | 4/2010 | Westbrook et al. |
| 7,698,154 B2 | 4/2010 | Marchosky |
| 8,062,220 B2 | 11/2011 | Kurtz et al. |
| 8,169,404 B1 | 5/2012 | Boillot |
| 8,179,604 B1 | 5/2012 | Prada Gomez et al. |
| 8,289,185 B2 | 10/2012 | Alonso |
| 8,301,232 B2 | 10/2012 | Albert et al. |
| 8,334,226 B2 | 12/2012 | Nhan et al. |
| 8,475,367 B1 | 7/2013 | Yuen et al. |
| 8,560,972 B2 | 10/2013 | Wilson |
| 8,700,137 B2 | 4/2014 | Albert |
| 8,758,020 B2 | 6/2014 | Burdea et al. |
| 8,759,713 B2 | 6/2014 | Sheats |
| 8,764,651 B2 | 7/2014 | Tran |
| 8,790,257 B2 | 7/2014 | Libbus et al. |
| 9,125,456 B2 | 9/2015 | Chow |
| 9,141,194 B1 | 9/2015 | Keyes et al. |
| 9,335,825 B2 | 5/2016 | Rautianinen et al. |
| 9,575,560 B2 | 2/2017 | Poupyrev et al. |
| 9,588,625 B2 | 3/2017 | Poupyrev |
| 9,594,443 B2 | 3/2017 | VanBlon et al. |
| 9,693,592 B2 | 7/2017 | Robinson et al. |
| 9,778,749 B2 | 10/2017 | Poupyrev |
| 9,811,164 B2 | 11/2017 | Poupyrev |
| 9,837,760 B2 | 12/2017 | Karagozler et al. |
| 9,921,660 B2 | 3/2018 | Poupyrev |
| 9,933,908 | 4/2018 | Poupyrev |
| 2002/0080156 A1 | 6/2002 | Abbott et al. |
| 2002/0170897 A1 | 11/2002 | Hall |
| 2003/0100228 A1 | 5/2003 | Bungo et al. |
| 2003/0119391 A1 | 6/2003 | Swallow et al. |
| 2004/0009729 A1 | 1/2004 | Hill et al. |
| 2004/0259391 A1 | 12/2004 | Jung et al. |
| 2005/0069695 A1 | 3/2005 | Jung et al. |
| 2005/0128124 A1* | 6/2005 | Greneker, III ........ A61B 5/0507 342/22 |
| 2005/0148876 A1 | 7/2005 | Endoh et al. |
| 2006/0035554 A1 | 2/2006 | Glaser et al. |
| 2006/0040739 A1 | 2/2006 | Wells |
| 2006/0157734 A1 | 7/2006 | Onodera et al. |
| 2006/0166620 A1 | 7/2006 | Sorensen |
| 2006/0258205 A1 | 11/2006 | Locher et al. |
| 2007/0118043 A1 | 5/2007 | Oliver et al. |
| 2007/0161921 A1 | 7/2007 | Rausch |
| 2007/0176821 A1 | 8/2007 | Flom et al. |
| 2007/0197115 A1 | 8/2007 | Eves et al. |
| 2007/0197878 A1 | 8/2007 | Shklarski |
| 2007/0210074 A1 | 9/2007 | Maurer et al. |
| 2008/0024438 A1 | 1/2008 | Collins et al. |
| 2008/0065291 A1 | 3/2008 | Breed |
| 2008/0134102 A1 | 6/2008 | Movold et al. |
| 2008/0136775 A1 | 6/2008 | Conant |
| 2008/0168396 A1 | 7/2008 | Matas et al. |
| 2008/0211766 A1 | 9/2008 | Westerman et al. |
| 2008/0233822 A1 | 9/2008 | Swallow et al. |
| 2008/0282665 A1 | 11/2008 | Speleers |
| 2008/0291158 A1 | 11/2008 | Park et al. |
| 2008/0303800 A1 | 12/2008 | Elwell |
| 2008/0316085 A1 | 12/2008 | Rofougaran et al. |
| 2008/0320419 A1 | 12/2008 | Matas et al. |
| 2009/0033585 A1 | 2/2009 | Lang |
| 2009/0053950 A1 | 2/2009 | Surve |
| 2009/0056300 A1 | 3/2009 | Chung et al. |
| 2009/0058820 A1 | 3/2009 | Hinckley |
| 2009/0113298 A1 | 4/2009 | Jung et al. |
| 2009/0115617 A1 | 5/2009 | Sano et al. |
| 2009/0118648 A1 | 5/2009 | Kandori et al. |
| 2009/0149036 A1 | 6/2009 | Lee et al. |
| 2009/0177068 A1 | 7/2009 | Stivoric et al. |
| 2009/0270690 A1 | 10/2009 | Roos et al. |
| 2009/0288762 A1 | 11/2009 | Wolfel |
| 2009/0295712 A1 | 12/2009 | Ritzau |
| 2010/0065320 A1 | 3/2010 | Urano |
| 2010/0071205 A1 | 3/2010 | Graumann et al. |
| 2010/0094141 A1 | 4/2010 | Puswella |
| 2010/0201586 A1 | 8/2010 | Michalk |
| 2010/0205667 A1 | 8/2010 | Anderson et al. |
| 2010/0208035 A1 | 8/2010 | Pinault et al. |
| 2010/0225562 A1 | 9/2010 | Smith |
| 2010/0241009 A1 | 9/2010 | Petkie |
| 2010/0281438 A1 | 11/2010 | Latta et al. |
| 2010/0313414 A1 | 12/2010 | Sheats |
| 2010/0325770 A1 | 12/2010 | Chung et al. |
| 2011/0003664 A1 | 1/2011 | Richard |
| 2011/0010014 A1 | 1/2011 | Oexman et al. |
| 2011/0073353 A1 | 3/2011 | Lee et al. |
| 2011/0093820 A1 | 4/2011 | Zhang et al. |
| 2011/0166940 A1* | 7/2011 | Bangera ............... G01S 7/412 705/14.66 |
| 2011/0181509 A1 | 7/2011 | Rautiainen et al. |
| 2011/0181510 A1 | 7/2011 | Hakala et al. |
| 2011/0197263 A1 | 8/2011 | Stinson, III |
| 2011/0213218 A1 | 9/2011 | Weiner et al. |
| 2011/0221666 A1 | 9/2011 | Newton et al. |
| 2011/0234492 A1 | 9/2011 | Ajmera et al. |
| 2011/0239118 A1 | 9/2011 | Yamaoka et al. |
| 2011/0303341 A1 | 12/2011 | Meiss et al. |
| 2011/0307842 A1 | 12/2011 | Chiang et al. |
| 2011/0318985 A1 | 12/2011 | McDermid |
| 2012/0001875 A1 | 1/2012 | Li et al. |
| 2012/0047468 A1 | 2/2012 | Santos et al. |
| 2012/0068876 A1 | 3/2012 | Bangera et al. |
| 2012/0092284 A1 | 4/2012 | Rofougaran et al. |
| 2012/0123232 A1 | 5/2012 | Najarian et al. |
| 2012/0127082 A1 | 5/2012 | Kushler et al. |
| 2012/0144934 A1 | 6/2012 | Russell et al. |
| 2012/0146950 A1 | 6/2012 | Park et al. |
| 2012/0150493 A1 | 6/2012 | Casey et al. |
| 2012/0174736 A1 | 7/2012 | Wang et al. |
| 2012/0193801 A1 | 8/2012 | Gross et al. |
| 2012/0248093 A1 | 10/2012 | Ulrich et al. |
| 2012/0254810 A1 | 10/2012 | Heck et al. |
| 2012/0268416 A1 | 10/2012 | Pirogov et al. |
| 2012/0280900 A1 | 11/2012 | Wang et al. |
| 2012/0310665 A1 | 12/2012 | Xu et al. |
| 2013/0016070 A1 | 1/2013 | Starner et al. |
| 2013/0046544 A1 | 2/2013 | Kay et al. |
| 2013/0053653 A1 | 2/2013 | Cuddihy et al. |
| 2013/0082922 A1 | 4/2013 | Miller |
| 2013/0102217 A1 | 4/2013 | Jeon |
| 2013/0104084 A1 | 4/2013 | Mlyniec et al. |
| 2013/0132931 A1 | 5/2013 | Bruns et al. |
| 2013/0147833 A1 | 6/2013 | Aubauer et al. |
| 2013/0150735 A1 | 6/2013 | Cheng |
| 2013/0194173 A1 | 8/2013 | Zhu et al. |
| 2013/0196716 A1 | 8/2013 | Muhammad |
| 2013/0207962 A1 | 8/2013 | Oberdorfer et al. |
| 2013/0260630 A1 | 10/2013 | Ito et al. |
| 2013/0278499 A1 | 10/2013 | Anderson |

(56) References Cited

U.S. PATENT DOCUMENTS

| | | |
|---|---|---|
| 2013/0283203 A1 | 10/2013 | Batraski et al. |
| 2013/0332438 A1 | 12/2013 | Li et al. |
| 2013/0345569 A1 | 12/2013 | Mestha et al. |
| 2014/0005809 A1 | 1/2014 | Frei et al. |
| 2014/0049487 A1 | 2/2014 | Konertz et al. |
| 2014/0070957 A1 | 3/2014 | Longinotti-Buitoni et al. |
| 2014/0073969 A1 | 3/2014 | Zou et al. |
| 2014/0081100 A1 | 3/2014 | Muhsin et al. |
| 2014/0095480 A1 | 4/2014 | Marantz et al. |
| 2014/0121540 A1 | 5/2014 | Raskin |
| 2014/0135631 A1 | 5/2014 | Brumback et al. |
| 2014/0139422 A1* | 5/2014 | Mistry .................. G06F 3/014 345/156 |
| 2014/0139616 A1 | 5/2014 | Pinter et al. |
| 2014/0143678 A1 | 5/2014 | Mistry et al. |
| 2014/0145955 A1 | 5/2014 | Gomez et al. |
| 2014/0184496 A1 | 7/2014 | Gribetz et al. |
| 2014/0191939 A1 | 7/2014 | Penn et al. |
| 2014/0200416 A1 | 7/2014 | Kashef et al. |
| 2014/0208275 A1 | 7/2014 | Mongia et al. |
| 2014/0215389 A1 | 7/2014 | Walsh et al. |
| 2014/0239065 A1 | 8/2014 | Zhou et al. |
| 2014/0244277 A1 | 8/2014 | Krishna Rao et al. |
| 2014/0246415 A1 | 9/2014 | Wittkowski |
| 2014/0247212 A1 | 9/2014 | Kim et al. |
| 2014/0250515 A1 | 9/2014 | Jakobsson |
| 2014/0253431 A1 | 9/2014 | Gossweiler et al. |
| 2014/0253709 A1 | 9/2014 | Bresch et al. |
| 2014/0262478 A1 | 9/2014 | Harris et al. |
| 2014/0280295 A1 | 9/2014 | Kurochikin et al. |
| 2014/0281975 A1 | 9/2014 | Anderson |
| 2014/0297006 A1 | 10/2014 | Sadhu |
| 2014/0306936 A1 | 10/2014 | Dahl et al. |
| 2014/0316261 A1 | 10/2014 | Lux et al. |
| 2014/0318699 A1 | 10/2014 | Longinotti-Buitoni et al. |
| 2014/0324888 A1 | 10/2014 | Xie et al. |
| 2014/0343392 A1 | 11/2014 | Yang |
| 2014/0347295 A1 | 11/2014 | Kim et al. |
| 2014/0357369 A1 | 12/2014 | Callens et al. |
| 2015/0002391 A1 | 1/2015 | Chen |
| 2015/0009096 A1 | 1/2015 | Lee et al. |
| 2015/0029050 A1 | 1/2015 | Driscoll et al. |
| 2015/0030256 A1* | 1/2015 | Brady .................. H01Q 3/24 382/254 |
| 2015/0040040 A1 | 2/2015 | Balan et al. |
| 2015/0068069 A1 | 3/2015 | Tran et al. |
| 2015/0077282 A1 | 3/2015 | Mohamadi |
| 2015/0085060 A1 | 3/2015 | Fish et al. |
| 2015/0091858 A1 | 4/2015 | Rosenberg et al. |
| 2015/0091859 A1 | 4/2015 | Rosenberg et al. |
| 2015/0112606 A1 | 4/2015 | He et al. |
| 2015/0133017 A1 | 5/2015 | Liao et al. |
| 2015/0143601 A1 | 5/2015 | Longinotti-Buitoni et al. |
| 2015/0145805 A1 | 5/2015 | Liu |
| 2015/0162729 A1 | 6/2015 | Reversat et al. |
| 2015/0177866 A1 | 6/2015 | Hwang et al. |
| 2015/0199045 A1 | 7/2015 | Robucci et al. |
| 2015/0256763 A1 | 9/2015 | Niemi |
| 2015/0261320 A1 | 9/2015 | Leto |
| 2015/0268027 A1 | 9/2015 | Gerdes |
| 2015/0268799 A1 | 9/2015 | Starner et al. |
| 2015/0277569 A1 | 10/2015 | Sprenger et al. |
| 2015/0280102 A1 | 10/2015 | Tajitsu et al. |
| 2015/0312041 A1 | 10/2015 | Choi |
| 2015/0332075 A1 | 11/2015 | Burch |
| 2015/0346820 A1 | 12/2015 | Poupyrev et al. |
| 2015/0375339 A1 | 12/2015 | Sterling et al. |
| 2016/0018948 A1 | 1/2016 | Parvarandeh et al. |
| 2016/0026253 A1 | 1/2016 | Bradski et al. |
| 2016/0038083 A1 | 2/2016 | Ding et al. |
| 2016/0041617 A1 | 2/2016 | Poupyrev |
| 2016/0041618 A1 | 2/2016 | Poupyrev |
| 2016/0048235 A1 | 2/2016 | Poupyrev |
| 2016/0048236 A1 | 2/2016 | Poupyrev |
| 2016/0054792 A1 | 2/2016 | Poupyrev |
| 2016/0054803 A1 | 2/2016 | Poupyrev |
| 2016/0054804 A1 | 2/2016 | Gollakata et al. |
| 2016/0055201 A1 | 2/2016 | Poupyrev et al. |
| 2016/0098089 A1 | 4/2016 | Poupyrev |
| 2016/0103500 A1 | 4/2016 | Hussey et al. |
| 2016/0106328 A1 | 4/2016 | Mestha et al. |
| 2016/0145776 A1 | 5/2016 | Roh |
| 2016/0186366 A1 | 6/2016 | McMaster |
| 2016/0216825 A1 | 7/2016 | Forutanpour |
| 2016/0249698 A1 | 9/2016 | Berzowska et al. |
| 2016/0253044 A1* | 9/2016 | Katz .................. G06F 3/017 345/156 |
| 2016/0259037 A1 | 9/2016 | Molchanov et al. |
| 2016/0282988 A1 | 9/2016 | Poupyrev |
| 2016/0283101 A1 | 9/2016 | Schwesig et al. |
| 2016/0284436 A1 | 9/2016 | Fukuhara et al. |
| 2016/0299526 A1* | 10/2016 | Inagaki .................. G06F 1/163 |
| 2016/0320852 A1 | 11/2016 | Poupyrev |
| 2016/0320853 A1 | 11/2016 | Lien et al. |
| 2016/0320854 A1 | 11/2016 | Lien et al. |
| 2016/0345638 A1 | 12/2016 | Robinson et al. |
| 2016/0349790 A1* | 12/2016 | Connor .................. G06F 1/1694 |
| 2016/0349845 A1 | 12/2016 | Poupyrev et al. |
| 2017/0060298 A1 | 3/2017 | Hwang et al. |
| 2017/0075496 A1 | 3/2017 | Rosenberg et al. |
| 2017/0125940 A1 | 5/2017 | Karagozler et al. |
| 2017/0196513 A1 | 7/2017 | Longinotti-Buitoni et al. |
| 2017/0232538 A1 | 8/2017 | Robinson et al. |
| 2017/0249033 A1 | 8/2017 | Podhajny et al. |
| 2017/0322633 A1* | 11/2017 | Shen .................. G06K 9/00335 |
| 2017/0325337 A1 | 11/2017 | Karagozler et al. |
| 2017/0325518 A1 | 11/2017 | Poupyrev et al. |
| 2017/0329425 A1 | 11/2017 | Karagozler et al. |
| 2018/0004301 A1 | 1/2018 | Poupyrev |
| 2018/0046258 A1 | 2/2018 | Poupyrev |

FOREIGN PATENT DOCUMENTS

| | | |
|---|---|---|
| DE | 102011075725 | 11/2012 |
| DE | 102013201359 | 7/2014 |
| EP | 0161895 | 11/1985 |
| GB | 2070469 | 9/1981 |
| GB | 2443208 | 4/2008 |
| JP | 2003280049 | 10/2003 |
| JP | 2006234716 | 9/2006 |
| JP | 2010049583 | 3/2010 |
| JP | 2011003202 | 1/2011 |
| JP | 2011102457 | 5/2011 |
| JP | 2014503873 | 2/2014 |
| WO | WO-2001027855 | 4/2001 |
| WO | WO-0175778 | 10/2001 |
| WO | WO-2002082999 | 10/2002 |
| WO | WO-2005033387 | 4/2005 |
| WO | 2007125298 | 11/2007 |
| WO | WO-2008061385 | 5/2008 |
| WO | WO-2009032073 | 3/2009 |
| WO | 2009083467 | 7/2009 |
| WO | WO-2010032173 | 3/2010 |
| WO | WO-2012026013 | 3/2012 |
| WO | WO-2012152476 | 11/2012 |
| WO | WO-2013082806 | 6/2013 |
| WO | WO-2013186696 | 12/2013 |
| WO | WO-2013191657 | 12/2013 |
| WO | WO-2014019085 | 2/2014 |
| WO | WO-2014116968 | 7/2014 |
| WO | WO-2014136027 | 9/2014 |
| WO | WO-2014138280 | 9/2014 |
| WO | WO-2014160893 | 10/2014 |
| WO | WO-2014165476 | 10/2014 |
| WO | WO-2014204323 | 12/2014 |
| WO | WO-2015022671 | 2/2015 |
| WO | 2016053624 | 4/2016 |
| WO | 20170200949 | 11/2017 |

OTHER PUBLICATIONS

"Corrected Notice of Allowance", U.S. Appl. No. 14/312,486, dated Jan. 23, 2017, 4 pages.

(56) References Cited

OTHER PUBLICATIONS

"Corrected Notice of Allowance", U.S. Appl. No. 14/312,486, dated Oct. 28, 2016, 4 pages.
"Corrected Notice of Allowance", U.S. Appl. No. 14/504,061, dated Dec. 27, 2016, 2 pages.
"Corrected Notice of Allowance", U.S. Appl. No. 14/582,896, dated Feb. 6, 2017, 2 pages.
"Corrected Notice of Allowance", U.S. Appl. No. 14/582,896, dated Dec. 19, 2016, 2 pages.
"Extended European Search Report", EP Application No. 15170577.9, dated Nov. 5, 2015, 12 pages.
"Final Office Action", U.S. Appl. No. 14/312,486, dated Jun. 3, 2016, 32 pages.
"Final Office Action", U.S. Appl. No. 14/504,038, dated Sep. 27, 2016, 23 pages.
"Final Office Action", U.S. Appl. No. 14/504,061, Mar. 9, 2016, 10 pages.
"Frogpad Introduces Wearable Fabric Keyboard with Bluetooth Technology", Retrieved From: <http://www.geekzone.co.nz/content.asp?contentid=3898> Mar. 16, 2015, Jan. 7, 2005, 2 pages.
"International Search Report and Written Opinion", Application No. PCT/US2015/044774, dated Nov. 3, 2015, 12 pages.
"International Search Report and Written Opinion", Application No. PCT/US2016/024267, dated Jun. 20, 2016, 13 pages.
"International Search Report and Written Opinion", Application No. PCT/US2016/024273, dated Jun. 20, 2016, 13 pages.
"International Search Report and Written Opinion", Application No. PCT/US2016/032307, dated Aug. 25, 2016, 13 pages.
"International Search Report and Written Opinion", Application No. PCT/US2016/029820, dated Jul. 15, 2016, 14 pages.
"International Search Report and Written Opinion", Application No. PCT/US2016/030177, dated Aug. 2, 2016, 15 pages.
"International Search Report and Written Opinion", Application No. PCT/US2015/043963, dated Nov. 24, 2015, 16 pages.
"International Search Report and Written Opinion", Application No. PCT/US2016/024289, dated Aug. 25, 2016, 17 pages.
"International Search Report and Written Opinion", Application No. PCT/US2015/050903, dated Feb. 19, 2016, 18 pages.
"International Search Report and Written Opinion", Application No. PCT/US2016/030115, dated Aug. 8, 2016, 18 pages.
"International Search Report and Written Opinion", Application No. PCT/US2015/043949, dated Dec. 1, 2015, 18 pages.
"Non-Final Office Action", U.S. Appl. No. 14/312,486, dated Oct. 23, 2015, 25 pages.
"Non-Final Office Action", U.S. Appl. No. 14/504,038, dated Feb. 26, 2016, 22 pages.
"Non-Final Office Action", U.S. Appl. No. 14/504,061, dated Nov. 4, 2015, 8 pages.
"Non-Final Office Action", U.S. Appl. No. 14/504,121, dated Jan. 9, 2017, 13 pages.
"Non-Final Office Action", U.S. Appl. No. 14/504,139, dated Jan. 27, 2017, 10 pages.
"Non-Final Office Action", U.S. Appl. No. 14/518,863, dated Oct. 14, 2016, 16 pages.
"Non-Final Office Action", U.S. Appl. No. 14/582,896, dated Jun. 29, 2016, 9 pages.
"Non-Final Office Action", U.S. Appl. No. 14/666,155, dated Aug. 24, 2016, 9 pages.
"Non-Final Office Action", U.S. Appl. No. 14/681,625, dated Aug. 12, 2016, 9 pages.
"Non-Final Office Action", U.S. Appl. No. 14/930,220, dated Sep. 14, 2016, 15 pages.
"Non-Final Office Action", U.S. Appl. No. 14/959,799, dated Jan. 27, 2017, 10 pages.
"Notice of Allowance", U.S. Appl. No. 14/312,486, dated Oct. 7, 2016, 15 pages.
"Notice of Allowance", U.S. Appl. No. 14/504,061, dated Sep. 12, 2016, 7 pages.
"Notice of Allowance", U.S. Appl. No. 14/582,896, dated Nov. 7, 2016, 5 pages.
"Notice of Allowance", U.S. Appl. No. 14/930,220, dated Feb. 2, 2017, 8 pages.
"Philips Vital Signs Camera", Retrieved From: <http://www.vitalsignscamera.com/> Apr. 15, 2015, Jul. 17, 2013, 2 pages.
"Pre-Interview Communication", U.S. Appl. No. 14/494,863, dated Jan. 27, 2017, 5 pages.
"Pre-Interview Communication", U.S. Appl. No. 14/513,875, dated Oct. 21, 2016, 3 pages.
"Pre-Interview Communication", U.S. Appl. No. 14/959,730, dated Feb. 15, 2017, 3 pages.
"Pre-Interview Communication", U.S. Appl. No. 14/959,901, dated Feb. 10, 2017, 3 pages.
"Restriction Requirement", U.S. Appl. No. 14/666,155, dated Jul. 22, 2016, 5 pages.
"The Instant Blood Pressure app estimates blood pressure with your smartphone and our algorithm", Retrieved at: http://www.instantbloodpressure.com/—on Jun. 23, 2016, 6 pages.
Arbabian,"A 94GHz mm-Wave to Baseband Pulsed-Radar for Imaging and Gesture Recognition", 2012 IEEE, 2012 Symposium on VLSI Circuits Digest of Technical Papers, 2012, 2 pages, Jun. 15, 2012.
Balakrishnan,"Detecting Pulse from Head Motions in Video", In Proceedings: CVPR '13 Proceedings of the 2013 IEEE Conference on Computer Vision and Pattern Recognition Available at: <http://people.csail.mit.edu/mrub/vidmag/papers/Balakrishnan_Detecting_Pulse_from_2013_CVPR_paper.pdf>, Jun. 23, 2013, 8 pages.
Cheng,"Smart Textiles: From Niche to Mainstream", IEEE Pervasive Computing, Jul. 2013, pp. 81-84.
Couderc,"Detection of Atrial Fibrillation using Contactless Facial Video Monitoring", In Proceedings: Heart Rhythm Society, vol. 12, Issue 1 Available at: <http://www.heartrhythmjournal.com/article/S1547-5271(14)00924-2/pdf>, Jan. 2015, 7 pages.
Espina,"Wireless Body Sensor Network for Continuous Cuff-less Blood Pressure Monitoring", International Summer School on Medical Devices and Biosensors, 2006, Sep. 2006, 5 pages.
Farringdon,"Wearable Sensor Badge & Sensor Jacket for Context Awareness", Third International Symposium on Wearable Computers, Oct. 1999, 7 pages.
Godana,"Human Movement Characterization in Indoor Environment using GNU Radio Based Radar", Retrieved at: http://repository.tudelft.nl/islandora/object/uuid:414e1868-dd00-4113-9989-4c213f1f7094?collection=education, Nov. 30, 2009, 100 pages.
He,"A Continuous, Wearable, and Wireless Heart Monitor Using Head Ballistocardiogram (BCG) and Head Electrocardiogram (ECG) with a Nanowatt ECG Heartbeat Detection Circuit", In Proceedings: Thesis, Department of Electrical Engineering and Computer Science, Massachusetts Institute of Technology Available at: <http://dspace.mit.edu/handle/1721.1/79221>, Feb. 2013, 137 pages.
Holleis,"Evaluating Capacitive Touch Input on Clothes", Proceedings of the 10th International Conference on Human Computer Interaction, Jan. 1, 2008, 10 pages.
Nakajima,"Development of Real-Time Image Sequence Analysis for Evaluating Posture Change and Respiratory Rate of a Subject in Bed", In Proceedings: Physiological Measurement, vol. 22, No. 3 Retrieved From: <http://iopscience.iop.org/0967-3334/22/3/401/pdf/0967-3334_22_3_401.pdf> Feb. 27, 2015, Aug. 2001, 8 pages.
Patel,"Applications of Electrically Conductive Yarns in Technical Textiles", International Conference on Power System Technology (POWECON), Oct. 30, 2012, 6 pages.
Poh,"A Medical Mirror for Non-contact Health Monitoring", In Proceedings: ACM SIGGRAPH Emerging Technologies , Aug. 11, 2011 Available at: <http://affect.media.mit.edu/pdfs/11.Poh-etal-SIGGRAPH.pdf>, 2011, 1 page.
Poh,"Non-contact, Automated Cardiac Pulse Measurements Using Video Imaging and Blind Source Separation.", In Proceedings: Optics Express, vol. 18, No. 10 , May 10, 2010 Available at: <http://www.opticsinfobase.org/view_article.cfm?gotourl=http%3A%2F%Fwww%2Eopticsinfobase%2Eorg%2FDirectPDFAccess%2F77B04D55%2DBC95%2D6937%2D5BAC49A426378C02%5F199381%2Foe%2D18%2D1 May 7, 2010, 13 pages.

(56) References Cited

OTHER PUBLICATIONS

Pu,"Gesture Recognition Using Wireless Signals", Oct. 2014, pp. 15-18.
Pu,"Whole-Home Gesture Recognition Using Wireless Signals", MobiCom '13 Proceedings of the 19th annual international conference on Mobile computing & networking, Aug. 27, 2013, 12 pages.
Schneegass,"Towards a Garment OS: Supporting Application Development for Smart Garments", Wearable Computers, ACM, Sep. 2014, 6 pages.
Wang,"Exploiting Spatial Redundancy of Image Sensor for Motion Robust rPPG", In Proceedings: IEEE Transactions on Biomedical Engineering, vol. 62, Issue 2, Jan. 19, 2015, 11 pages.
Wang,"Micro-Doppler Signatures for Intelligent Human Gait Recognition Using a UWB Impulse Radar", 2011 IEEE International Symposium on Antennas and Propagation (APSURSI), Jul. 3, 2011, pp. 2103-2106.
Wijesiriwardana,"Capacitive Fibre-Meshed Transducer for Touch & Proximity Sensing Applications", IEEE Sensors Journal, IEEE Service Center, Oct. 1, 2005, 5 pages.
Zhadobov,"Millimeter-wave Interactions with the Human Body: State of Knowledge and Recent Advances", International Journal of Microwave and Wireless Technologies, Mar. 1, 2011, 11 pages.
Zhang,"Study of the Structural Design and Capacitance Characteristics of Fabric Sensor", Advanced Materials Research (vols. 194-196), Feb. 21, 2011, 8 pages.
"Advisory Action", U.S. Appl. No. 14/504,139, dated Aug. 28, 2017, 3 pages.
"Final Office Action", U.S. Appl. No. 15/398,147, dated Jun. 30, 2017, 11 pages.
"Final Office Action", U.S. Appl. No. 14/874,955, dated Jun. 30, 2017, 9 pages.
"Final Office Action", U.S. Appl. No. 14/504,121, dated Aug. 8, 2017, 16 pages.
"Final Office Action", U.S. Appl. No. 14/959,901, dated Aug. 25, 2017, 19 pages.
"Foreign Office Action", EP Application No. 15170577.9, dated May 30, 2017, 7 pages.
"Non-Final Office Action", U.S. Appl. No. 14/862,409, dated Jun. 22, 2017, 15 pages.
"Non-Final Office Action", U.S. Appl. No. 14/959,730, dated Jun. 23, 2017, 14 pages.
"Non-Final Office Action", U.S. Appl. No. 15/093,533, dated Aug. 24, 2017, 18 pages.
"Non-Final Office Action", U.S. Appl. No. 15/142,619,dated Aug. 25, 2017, 16 pages.
"Notice of Allowance", U.S. Appl. No. 14/513,875, dated Jun. 28, 2017, 7 pages.
"Notice of Allowance", U.S. Appl. No. 14/504,038, dated Aug. 7, 2017, 17 pages.
"Foreign Office Action", KR Application No. 10-2016-7032967, dated Sep. 14, 2017, 4 pages.
"Foreign Office Action", JP Application No. 2016-563979, dated Sep. 21, 2017, 15 pages.
"Non-Final Office Action", U.S. Appl. No. 14/959,799, dated Sep. 8, 2017, 16 pages.
"Non-Final Office Action", U.S. Appl. No. 15/398,147, dated Sep. 8, 2017, 7 pages.
"Non-Final Office Action", U.S. Appl. No. 14/518,863, dated Sep. 29, 2017, 20 pages.
"Non-Final Office Action", U.S. Appl. No. 15/142,689, dated Oct. 4, 2017, 18 pages.
"Non-Final Office Action", U.S. Appl. No. 14/504,139, dated Oct. 18, 2017, 12 pages.
"Notice of Allowance", U.S. Appl. No. 14/874,955, dated Oct. 20, 2017, 7 pages.
"Pre-Interview Office Action", U.S. Appl. No. 14/862,409, dated Sep. 15, 2017, 16 pages.
"Written Opinion", PCT Application No. PCT/US2017/032733, dated Jul. 26, 2017, 5 pages.

"Combined Search and Examination Report", GB Application No. 1620892.8, dated Apr. 6, 2017, 5 pages.
"Combined Search and Examination Report", GB Application No. 1620891.0, dated May 31, 2017, 9 pages.
"Corrected Notice of Allowance", U.S. Appl. No. 14/930,220, dated May 11, 2017, 2 pages.
"Final Office Action", U.S. Appl. No. 14/959,799, dated Jul. 19, 2017, 12 pages.
"Final Office Action", U.S. Appl. No. 14/518,863, dated May 5, 2017, 18 pages.
"International Preliminary Report on Patentability", Application No. PCT/US2015/050903, dated Apr. 13, 2017, 12 pages.
"International Search Report and Written Opinion", Application No. PCT/US2016/063874, dated May 11, 2017, 19 pages.
"Notice of Allowance", U.S. Appl. No. 14/494,863, dated May 30, 2017, 7 pages.
"Notice of Allowance", U.S. Appl. No. 15/343,067, dated Jul. 27, 2017, 9 pages.
"Final Office Action", U.S. Appl. No. 14/959,799, dated Jan. 4, 2018, 17 pages.
"Final Office Action", U.S. Appl. No. 14/959,730, dated Nov. 22, 2017, 16 pages.
"International Search Report and Written Opinion", PCT/US2017/047691, dated Nov. 16, 2017, 13 pages.
"International Search Report and Written Opinion", PCT Application No. PCT/US2017/051663, dated Nov. 29, 2017, 16 pages.
"Non-Final Office Action", U.S. Appl. No. 14/504,121, dated Jan. 2, 2018, 19 pages.
"Non-Final Office Action", U.S. Appl. No. 14/959,901, dated Jan. 8, 2018, 21 pages.
"Non-Final Office Action", U.S. Appl. No. 15/595,649, dated Oct. 31, 2017, 16 pages.
"Non-Final Office Action", U.S. Appl. No. 14/862,409, dated Dec. 14, 2017, 17 pages.
"Notice of Allowance", U.S. Appl. No. 15/398,147, dated Nov. 15, 2017, 8 pages.
"Restriction Requirement", U.S. Appl. No. 15/362,359, dated Jan. 8, 2018, 5 pages.
Bondade, et al., "A linear-assisted DC-DC hybrid power converter for envelope tracking RF power amplifiers", 2014 IEEE Energy Conversion Congress and Exposition (ECCE), IEEE, Sep. 14, 2014, pp. 5769-5773, XP032680873, DOI: 10.1109/ECCE.2014.6954193, dated Sep. 14, 2014, 5 pages.
Fan, et al., "Wireless Hand Gesture Recognition Based on Continuous-Wave Doppler Radar Sensors", IEEE Transactions on Microwave Theory and Techniques, Plenum, USA, vol. 64, No. 11, Nov. 1, 2016 (Nov. 1, 2016), pp. 4012-4012, XP011633246, ISSN: 0018-9480, DOI: 10.1109/TMTT.2016.2610427, Nov. 1, 2016, 9 pages.
Lien, et al., "Soli: Ubiquitous Gesture Sensing with Millimeter Wave Radar", ACM Transactions on Graphics (TOG), ACM, Us, vol. 35, No. 4, Jul. 11, 2016 (Jul. 11, 2016), pp. 1-19, XP058275791, ISSN: 0730-0301, DOI: 10.1145/2897824.2925953, Jul. 11, 2016, 19 pages.
Martinez-Garcia, et al., "Four-quadrant linear-assisted DC/DC voltage regulator", Analog Integrated Circuits and Signal Processing, Springer New York LLC, US, vol. 88, No. 1, Apr. 23, 2016 (Apr. 23, 2016) , pp. 151-160, XP035898949, ISSN: 0925-1030, DOI: 10.1007/S10470-016-0747-8, Apr. 23, 2016, 10 pages.
Skolnik, "CW and Frequency-Modulated Radar", in: "Introduction to Radar Systems", Jan. 1, 1981 (Jan. 1, 1981), McGraw Hill, XP055047545, ISBN: 978-0-07-057909-5 pp. 68-100, p. 95-p. 97, dated Jan. 1, 1981, 18 pages.
Zheng, et al., "Doppler Bio-Signal Detection Based Time-Domain Hand Gesture Recognition", 2013 IEEE MTT-S International Microwave Workshop Series on RF and Wireless Technologies for Biomedical and Healthcare Applications (IMWS-BIO), IEEE, Dec. 3, 2013 (Dec. 9, 2013), p. 3, XP032574214, DOI: 10.1109/IMWS-BIO.2013.6756200, Dec. 9, 2013, 3 Pages.
"Final Office Action", U.S. Appl. No. 15/142,619, Feb. 8, 2018, 15 pages.
"Final Office Action", U.S. Appl. No. 15/093,533, Mar. 21, 2018, 19 pages.

(56) References Cited

OTHER PUBLICATIONS

"First Action Interview Office Action", U.S. Appl. No. 15/286,152, dated Mar. 1, 2018, 5 pages.
"Foreign Office Action", Japanese Application No. 2016-563979, dated Feb. 7, 2018, 5 pages.
"Foreign Office Action", Chinese Application No. 201721290290.3, dated Mar. 9, 2018, 2 pages.
"Non-Final Office Action", U.S. Appl. No. 15/267,181, Feb. 8, 2018, 29 pages.
"Non-Final Office Action", U.S. Appl. No. 14/874,955, dated Feb. 8, 2018, 7 pages.
"Notice of Allowance", U.S. Appl. No. 14/959,730, dated Feb. 22, 2018, 8 pages.
"Pre-Interview Communication", U.S. Appl. No. 15/166,198, dated Mar. 8, 2018, 8 pages.
"Pre-Interview First Office Action", U.S. Appl. No. 15/286,152, dated Feb. 8, 2018, 4 pages.

* cited by examiner

RADAR-BASED GESTURE-RECOGNITION THROUGH A WEARABLE DEVICE

PRIORITY APPLICATION

This application claims priority under 35 U.S.C. § 119(e) to U.S. Provisional Patent Application No. 62/007,324, entitled "Radar-Based Gesture-Recognition through a Wearable Device" and filed on Jun. 3, 2014, and U.S. patent application Ser. No. 14/312,486, entitled "Radar-Based Gesture-Recognition through a Wearable Device" and filed Jun. 23, 2014, the disclosures of which is incorporated in its entirety by reference herein.

BACKGROUND

Wearable computing devices continue to increase in popularity, as these devices are small and light, easy to wear and keep track of, and often have substantial computing capabilities. Wearable computing devices, however, generally have small or difficult-to-use input interfaces. A computing ring or bracelet, for example, may use a very small touch screen through which to receive user input. Not only is it difficult for many user to see what to select, physically selecting the desired portion of the small touch screen can also be challenging. Other wearable computing devices, such as computing spectacles, may use small integrated buttons. Small integrated buttons offer few choices and may require users to remember functions associated with the buttons, resulting in a poor user experience.

To address these input limitations, users may augment their wearable computing devices with relatively large peripheral inputs interfaces, such as touch displays. This solution, however, adds another device, which increases cost, size, weight, and complexity for the user, which in turn defeats many of the reasons for which users desire wearable computing devices.

SUMMARY

This document describes techniques and devices for radar-based gesture-recognition through a wearable device. The techniques enable an easy-to-use input interface through this wearable radar device, in contrast to small or difficult-to-use input interfaces common to wearable computing devices. Further, these techniques are not limited to interfacing with wearable computing devices, but may aid users in controlling various non-wearable devices, such as to control volume on a stereo, pause a movie playing on a television, or select a webpage on a desktop computer.

This summary is provided to introduce simplified concepts concerning a radar-based gesture-recognition through a wearable device, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for radar-based gesture-recognition are described with reference to the following drawings. The same numbers are used throughout the drawings to reference like features and components.

DETAILED DESCRIPTION

Overview

This document describes techniques using, and devices embodying, radar-based gesture-recognition. These techniques and devices can enable a great breadth of gestures and uses for those gestures through a wearable radar system. When the wearable radar system is part of a wearable computing device, for example, radar-based gesture-recognition enables users to provide input through a surface larger than a bracelet or ring, such as to tap the top of the user's left hand with the user's right finger to input a selection. Here the larger surface is the top of the user's left hand on which a localized radar field is overlaid. The wearable radar system may instead be used to control and interact with other computing devices, such as to receive simple or highly complex gestures without a user having to touch a remote touch screen, make large body movements for a game controller, or walk to a sound system receiver to adjust a volume knob or button.

These are but two examples of how techniques and/or devices enabling use of radar-based gesture-recognition through a wearable device can be performed. This document now turns to an example environment, after which example radar-based gesture-recognition systems, example methods, and an example computing system are described.

Example Environment

Figure 1:
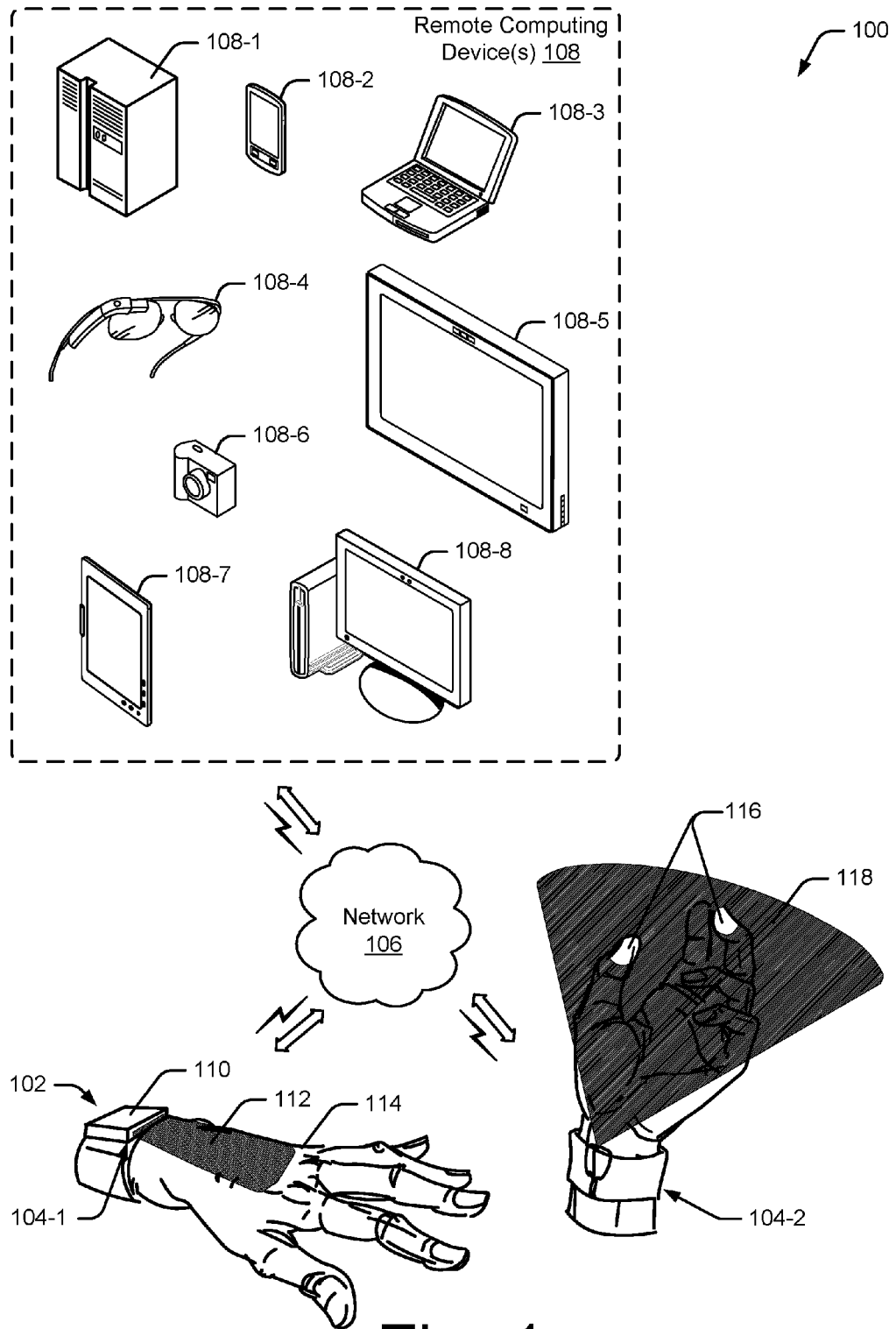
FIG. 1 illustrates an example environment in which radar-based gesture-recognition through a wearable device can be implemented.

FIG. 1 is an illustration of an example environment 100 in which techniques using, and an apparatus including, a radar-based gesture-recognition system may be embodied. Environment 100 includes a wearable computing device 102, wearable radar-based gesture-recognition systems 104, a network 106, and remote computing devices 108. Environment 100 includes two example devices and manners for using wearable radar-based gesture-recognition system 104, the first is shown at 104-1, in which the wearable radar-based gesture-recognition system is integral with wearable computing device 102, and the second is shown at 104-2, in which the wearable radar-based gesture-recognition system is independent of wearable computing device 102. These wearable radar-based gesture-recognition systems 104-1 and 104-2 are described generally below, after which they are illustrated in detail.

Wearable computing device 102 includes wearable radar-based gesture-recognition system 104-1, and in this case these devices work together to improve user interaction with wearable computing device 102. Assume, for example, that wearable computing device 102 includes a small touch screen 110 through which display and user interaction are performed. This small touch screen 110 can present some challenges to users, as the size for selecting inputs, and therefore generally the accuracy needed by users, can make interaction difficult and time-consuming consider, however, wearable radar-based gesture-recognition system 104-1, which provides a localized radar field 112 overlaying a top of a user's hand 114. As is readily apparent, an area through which a user may make selections is substantially increased over that of small touch screen 110.

Wearable radar-based gesture-recognition system 104-2 is shown independent of wearable computing device 102. Assume here that wearable radar-based gesture-recognition system 104-2 interacts with remote computing devices 108 through network 106 and by transmitting input responsive to recognizing gestures, here a thumb-and-middle-finger gesture 116 is shown interacting with localized radar field 118. Gestures can be mapped to various remote computing devices 108 and their applications, thereby enabling control of many devices and applications. Many complex and unique gestures can be recognized by wearable radar-based gesture-recognition systems 104, thereby permitting precise and/or single-gesture control, even for multiple applications. Wearable radar-based gesture-recognition systems 104, whether integrated with a computing device, having computing capabilities, or having few computing abilities, can each be used to interact with remote computing devices 108.

Network 106 includes one or more of many types of wireless or partly wireless communication networks, such as a local-area-network (LAN), a wireless local-area-network (WLAN), a personal-area-network (PAN), a wide-area-network (WAN), an intranet, the Internet, a peer-to-peer network, point-to-point network, a mesh network, and so forth.

Remote computing devices 108 are illustrated with various non-limiting example devices: server 108-1, smartphone 108-2, laptop 108-3, computing spectacles 108-4, television 108-5, camera 108-6, tablet 108-7, and desktop 108-8, though other devices may also be used, such as home automation and control systems, sound or entertainment systems, home appliances, security systems, netbooks, and e-readers. Note that remote computing device 108 can be wearable, non-wearable but mobile, or relatively immobile (e.g., desktops and servers).

Figure 2:
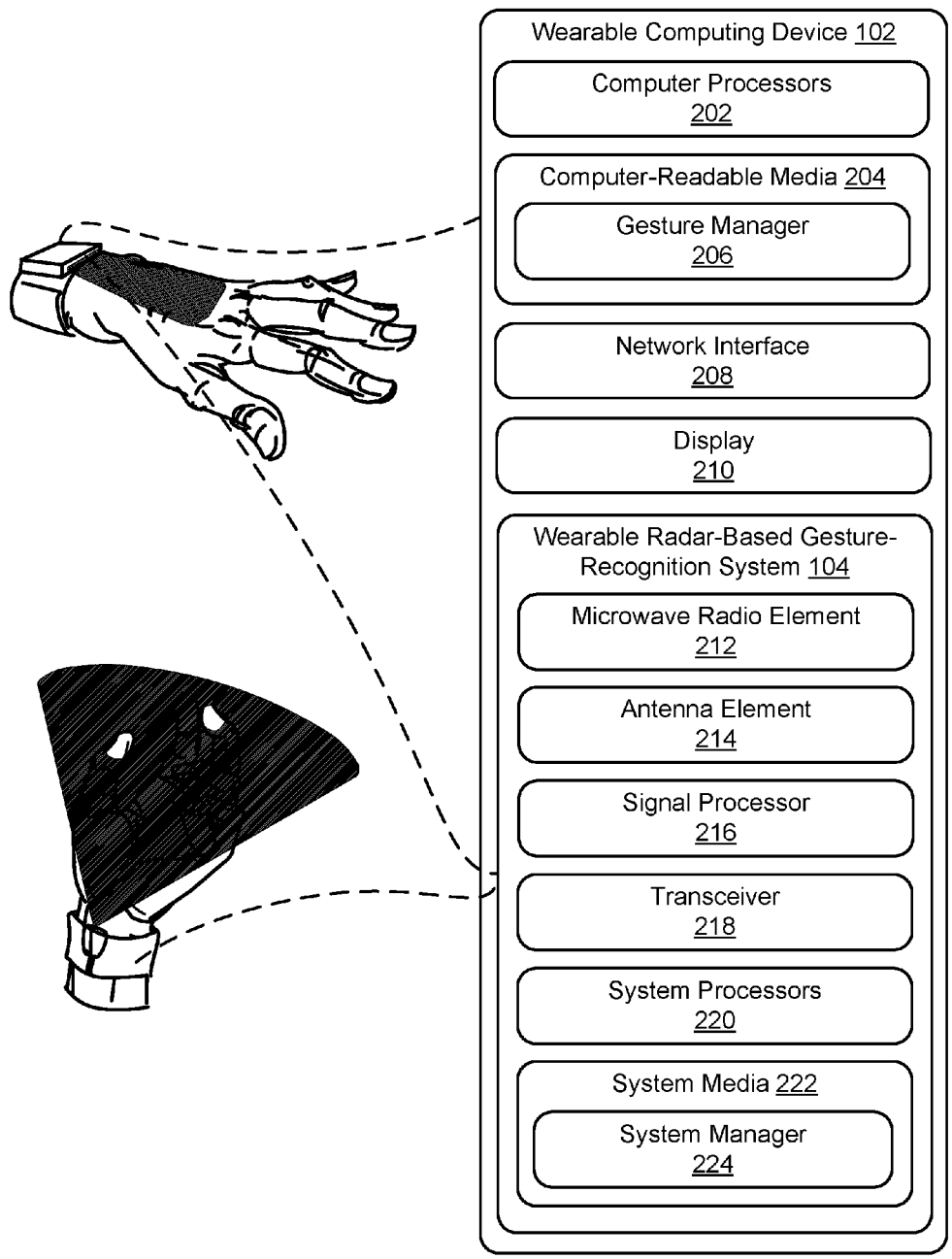
FIG. 2 illustrates an example wearable radar-based gesture-recognition system and wearable computing device.

In more detail, consider FIG. 2, which illustrates wearable radar-based gesture-recognition system 104 both as part, and independent of, wearable computing device 102. Note also that wearable radar-based gesture-recognition system 104 can be used with, or embedded within, many different garments, accessories, and computing devices, such as the example remote computing devices 108 noted above, jackets (e.g., with a localized radar field on a sleeve or sleeve collar), hats, books, computing rings, spectacles, and so forth. Further, the localized radar field can be invisible and penetrate some materials, such as textiles, thereby further expanding how the wearable radar-based gesture-recognition system 104 can be used and embodied. While examples shown herein generally show one wearable radar-based gesture-recognition system 104 per device, multiples can be used, thereby increasing a number and complexity of gestures, as well as accuracy and robust recognition. Wearable computing device 102 includes one or more computer processors 202 and computer-readable media 204, which includes memory media and storage media. Applications and/or an operating system (not shown) embodied as computer-readable instructions on computer-readable media 204 can be executed by processors 202 to provide some of the functionalities described herein. Computer-readable media 204 also includes gesture manager 206 (described below).

Computing device 102 may also include network interfaces 208 for communicating data over wired, wireless, or optical networks. By way of example and not limitation, network interface 208 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like (e.g., through network 106 of FIG. 1). Wearable computing device 102 includes a display 210, which can be touch-sensitive, though this is not required.

Wearable radar-based gesture-recognition system 104, as noted above, is configured to sense gestures. To enable this, wearable radar-based gesture-recognition system 104 includes a microwave radio element 212, an antenna element 214, and a signal processor 216.

Generally, microwave radio element 212 is configured to provide a localized radar field. This localized radar field is generally small, such as less than one half of one meter from the microwave radio element. Microwave radio element 212 can be configured to emit continuously modulated radiation, ultra-wideband radiation, or sub-millimeter-frequency radiation. Microwave radio element 212, in some cases, is configured to form radiation in beams, the beams aiding antenna element 214 and signal processor 216 to determine which of the beams are interrupted, and thus locations of interactions within the localized radar field.

Antenna element 214 is configured to sense interactions in the localized radar field, and signal processor 216 is configured to process the sensed interactions in the localized radar field sufficient to provide gesture data usable to determine a gesture from the sensed interactions. Antenna element 214 can include one or many sensors, such as an array of radiation sensors, the number in the array based on a desired resolution and whether the field is a surface, plane, or volume.

The field provided by microwave radio element 212 can be a three-dimensional (3D) volume (e.g., hemisphere, cube, or cylinder), a plane, or a surface applied to human tissue or non-human object. In the case of a 3D volume (or some embodiments of a field, plane, or surface), antenna element 214 is configured to sense interactions in the 3D volume of multiple targets (e.g., fingers, one moving finger, or hand elements such as knuckles or a palm), and signal processor 216 is configured to process the sensed interactions in the 3D volume sufficient to provide gesture data usable to determine gestures in three dimensions.

Figure 3:
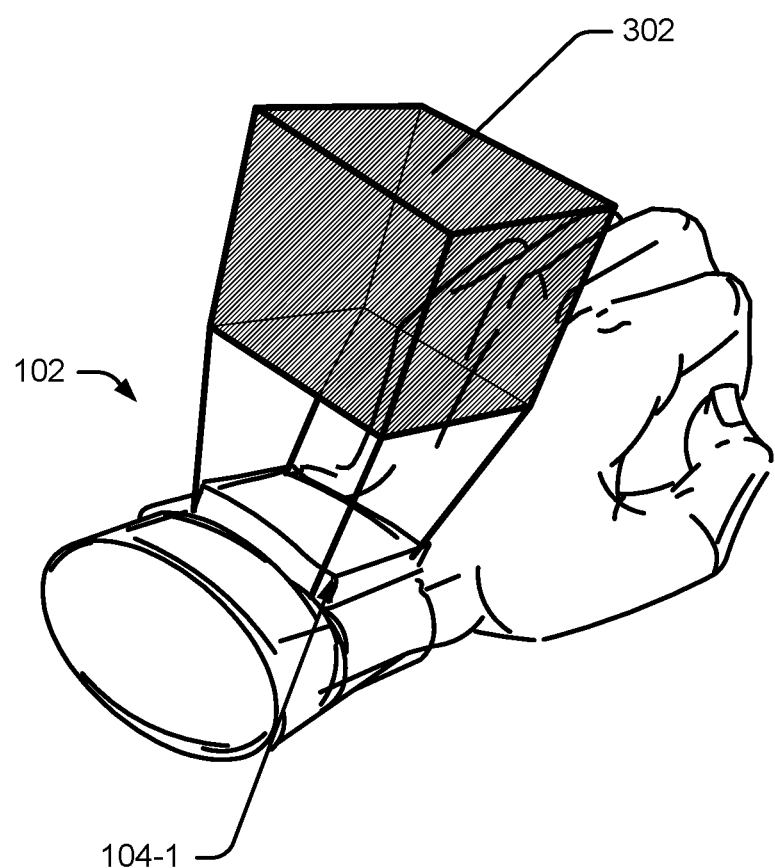
FIG. 3 illustrates an example 3D volume radar field emitted by the wearable radar-based gesture-recognition system of FIG. 2.

An example of a 3D volume is illustrated in FIG. 3, which shows 3D volume radar field 302 emitted by wearable radar-based gesture-recognition system 104-1 of wearable computing device 102. With 3D volume radar field 302, a user may perform complex or simple gestures with a right hand or device (e.g., a stylus) that interrupts the volume. Example gestures include the many gestures usable with current touch-sensitive displays, such as swipes, two-finger pinch and spread, tap, and so forth. Other gestures are enabled that are complex, or simple but three-dimensional, examples include the many sign-language gestures, e.g., those of American Sign Language (ASL) and other sign languages worldwide. A few of these include an up-and-down fist, which in ASL means "Yes", an open index and middle finger moving to connect to an open thumb, which means "No", a flat hand moving up a step, which means "Advance", a flat and angled hand moving up and down, which means "Afternoon", clenched fingers and open thumb moving to open fingers and an open thumb, which means "taxicab", an index finger moving up in a roughly vertical direction, which means "up", and so forth. These are but a few of many gestures that can be mapped to particular devices or applications, such as the Advance gesture to skip to another song on a web-based radio application, a next song on a compact disk playing on a stereo, or a next page or image in a file or album on a computer display or digital picture frame.

The localized radar field can also include a surface applied to human tissue or non-human object. In this case, antenna element 214 is configured to sense an interaction in the surface and signal processor 216 is configured to process the sensed interaction in the surface sufficient to provide gesture data usable to determine a gesture.

Figure 4:
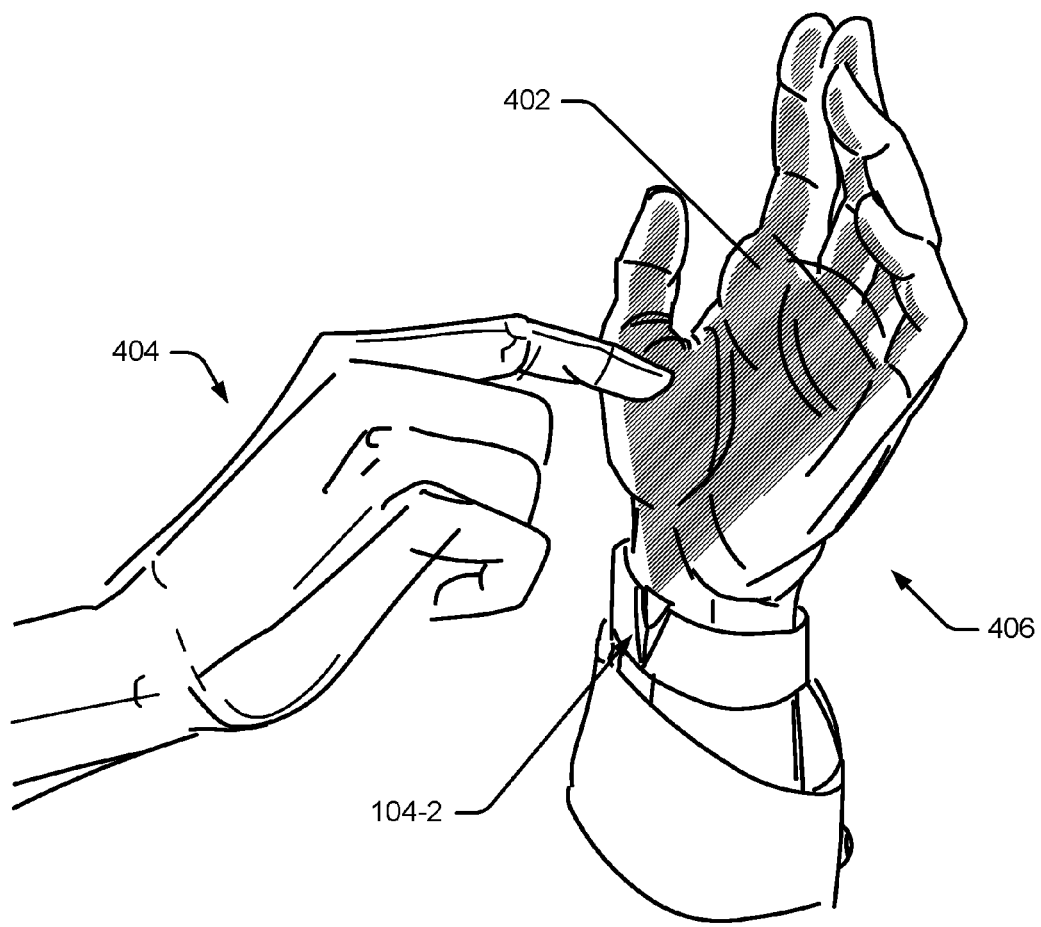
FIG. 4 illustrates an example surface radar field emitted by the wearable radar-based gesture-recognition system of FIG. 2.
Figure 5:
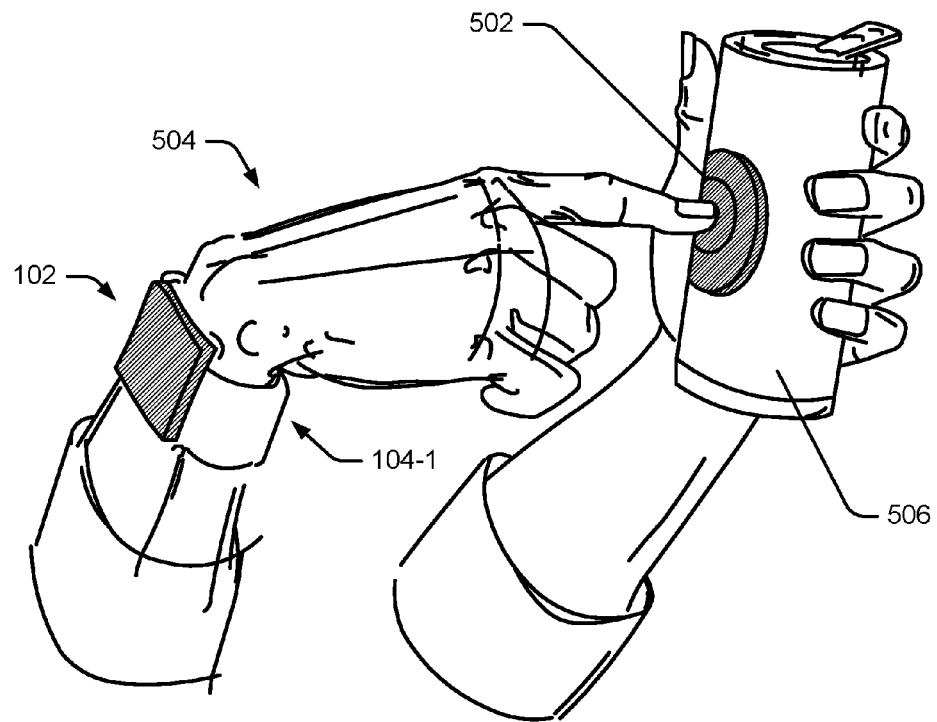
FIG. 5 illustrates another example surface radar field emitted by the wearable radar-based gesture-recognition system of FIG. 2.
Figure 6:
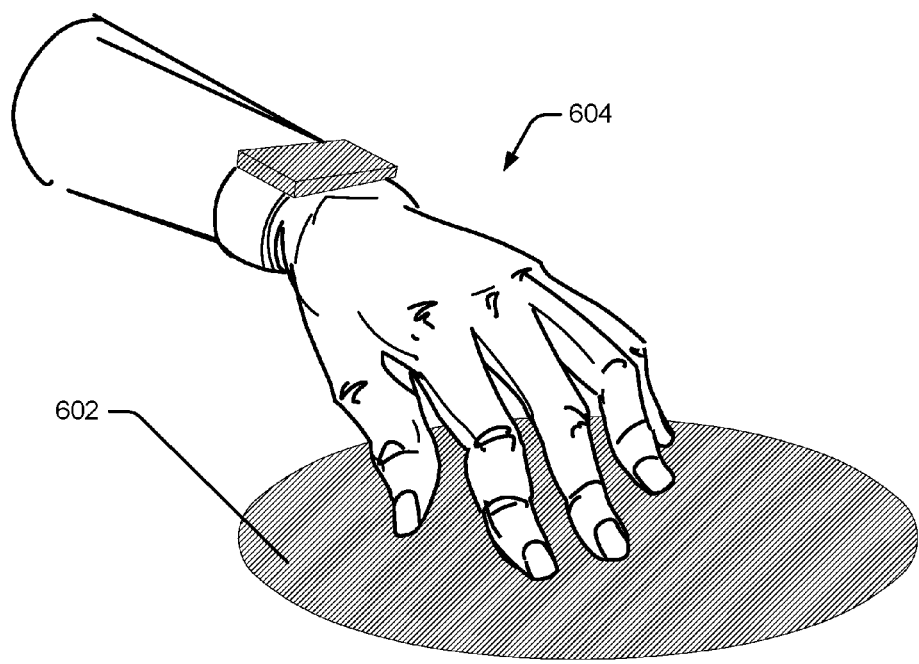
FIG. 6 illustrates a third example surface radar field emitted by the wearable radar-based gesture-recognition system of FIG. 2.

Example surfaces are illustrated in FIG. 1, at localized radar field 112, and in FIGS. 4, 5, and 6. FIG. 4 illustrates surface radar field 402 emitted by wearable radar-based gesture-recognition system 104-2 of FIG. 1. With surface radar field 402, a user's hand (right hand 404) may interact to perform gestures, such as to tap on the user's other hand (left hand 406), thereby interrupting surface radar field 402. Example gestures include single and multi-finger swipe, spread, squeeze, non-linear movements, and so forth. Similarly, FIGS. 5 and 6 illustrates surface radar fields 502 and 602, respectively, emitted by wearable radar-based gesture-recognition system 104-1 of FIG. 1 (obscured by right hand 504 or left hand 604) in conjunction with wearable computing device 102. With surface radar field 502 or 602, a same hand as a hand on which wearable radar-based gesture-recognition system 104-1 resides (right hand 504 or left hand 604) may interact with to perform gestures on curved object 506 (here a can) or a flat object (on which surface radar field 602 of FIG. 6 is applied, such as a table surface, a wall, etc.), thereby interrupting surface radar field 502 or 602.

The localized radar field can also include one or more planes through which a user may interact. In this case, antenna element 214 is configured to sense an interaction in the planes and signal processor 216 is configured to process the sensed interaction in the surface sufficient to provide gesture data usable to determine a gesture.

Figure 7:
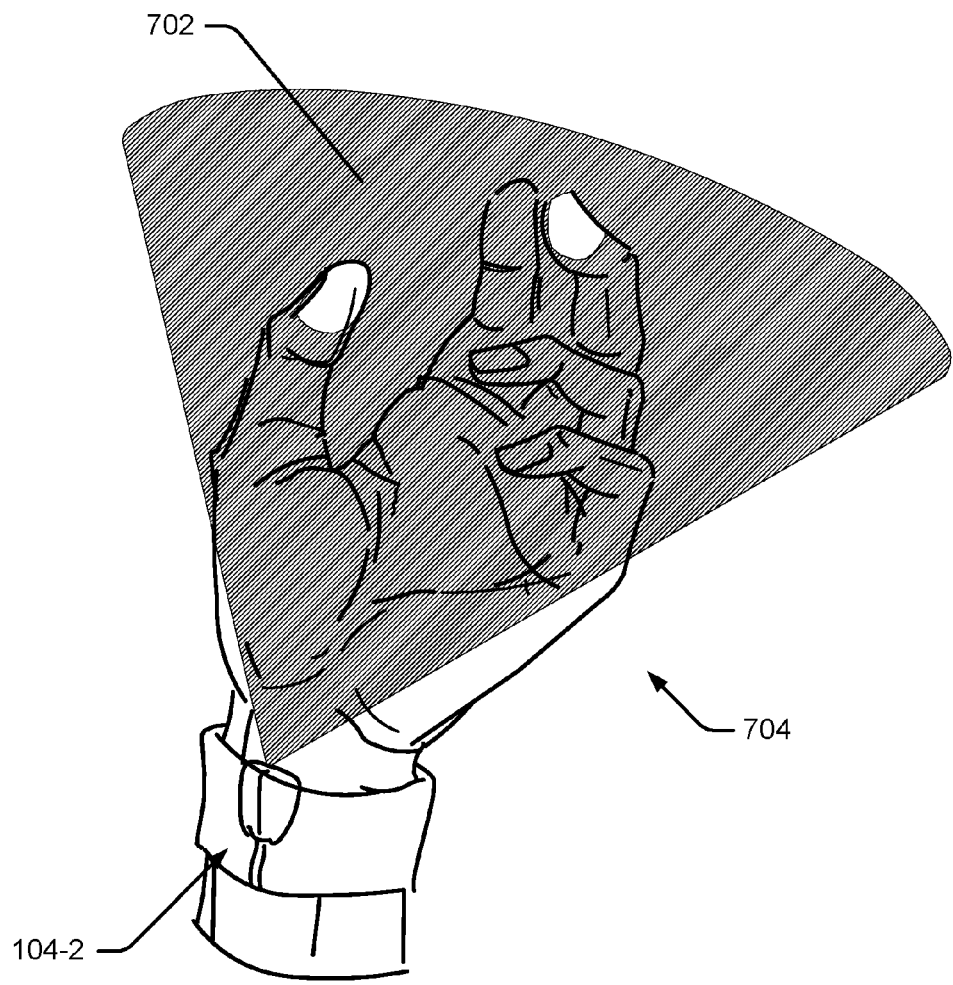
FIG. 7 illustrates an example planar radar field emitted by the wearable radar-based gesture-recognition system of FIG. 2.
Figure 8:
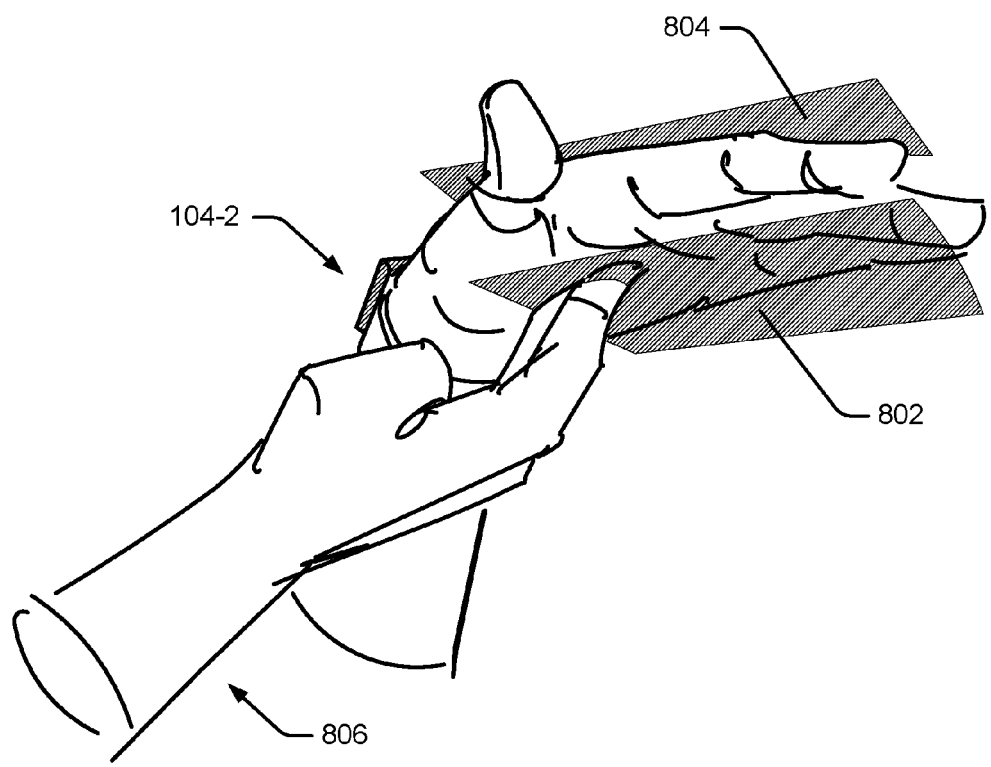
FIG. 8 illustrates a first interaction with an example dual-planar radar field emitted by the wearable radar-based gesture-recognition system of FIG. 2.
Figure 9:
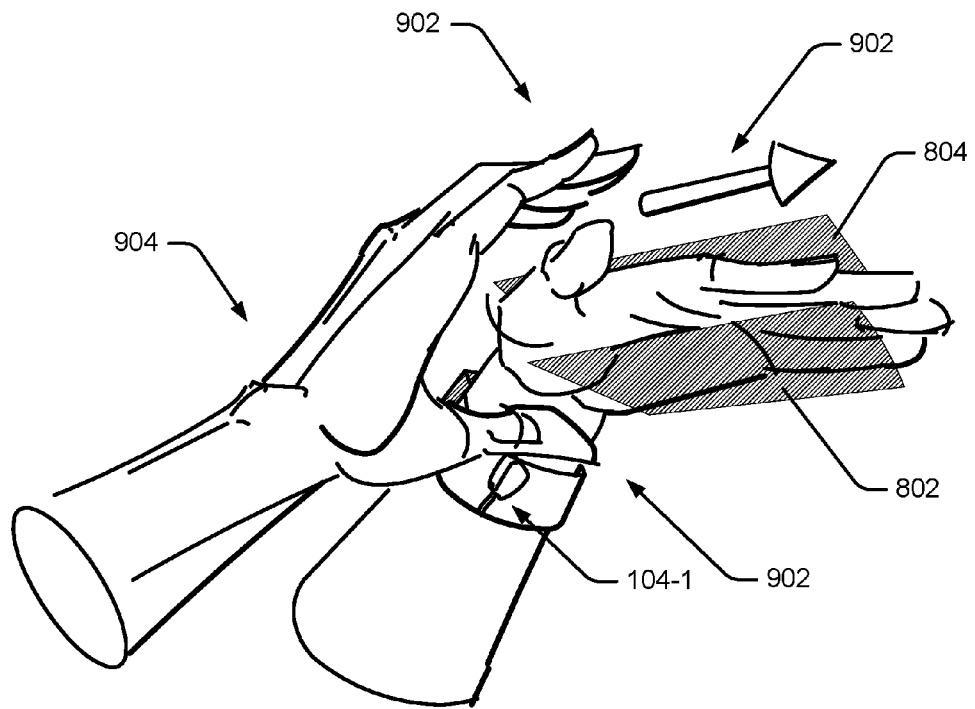
FIG. 9 illustrates a second interaction with the example dual-planar radar field of FIG. 8.

Example planes are illustrated in FIG. 1, at localized radar field 118, and in FIGS. 7, 8, and 9. FIG. 7 illustrates planar radar field 702 emitted by wearable radar-based gesture-recognition system 104-2 of FIG. 1. With planar radar field 702, a user's hand (left hand 704) may interact with the plane by performing gestures, such as to tap through the plane, thereby interrupting planar radar field 702, or through many of the other gestures contemplated herein, such as an up-and-down fist movement to mean "Yes". Other highly complex and simple gestures can used, including those common to touch-sensitive displays, but also many more because a gesture can continue through the plane, which is not permitted with touch-sensitive displays. For example, a gesture where two fingers are placed in the plane and the clutched back like a squeezing movement, can be interpreted as a new gesture relative to a two-finger tap or swipe.

FIGS. 8 and 9 illustrate interactions with example dual-planar radar fields 802 and 804, both emitted by one or more of wearable radar-based gesture-recognition system 104-1 (obscured in FIG. 8) or 104-2 (obscured in FIG. 9) of FIG. 1. FIG. 8 illustrates a user's right hand 806 interacting with one of the dual-planar radar fields, here field 802, through which the user may perform various gestures. FIG. 9 illustrates another interaction, here with both of dual-planar radar fields 802 and 804, with squeezing-and-moving action 902 performed by right hand 904. This is but one of many of the contemplated, complex gestures that are not permitted with a touch-sensitive display.

Figure 10:
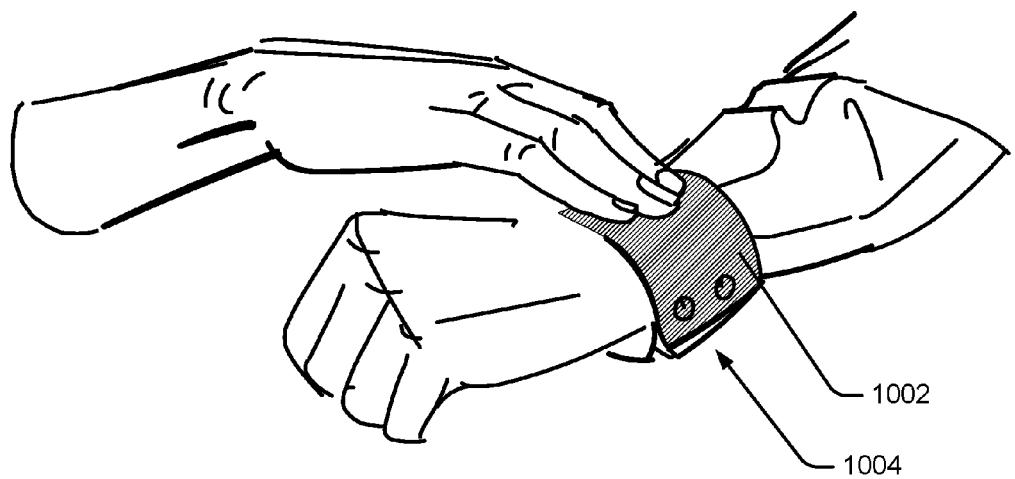
FIG. 10 illustrates an example radar field conforming to a shirt-sleeve collar emitted by the wearable radar-based gesture-recognition system of FIG. 2.

By way of a last illustrated example of localized radar fields, consider FIG. 10, which illustrates an example radar field 1002 conforming to a shirt-sleeve collar 1004 emitted by wearable radar-based gesture-recognition system 104 (obscured) of FIG. 1. As noted herein, the localized radar field can be emitted or sensed to be preferentially tailored to fabric or human tissue. In this case, shirt-sleeve collar 1004 can be a material affecting radar field 1002 or simply be any normal clothing material. Thus, shirt-sleeve collar 1004 can be similar to curved object 506 of FIG. 5 (affecting the radar field) or of localized radar fields shown in FIG. 3 (volume) or FIG. 4, 7, 8, or 9 (less or not affecting the radar field).

In addition to these example localized radar fields, other are also contemplated, such as volumetric fan visually similar to plane 702 of FIG. 7, or multiple planes or surfaces to better enable multi-hand gestures. Thus, two or more planes provided by microwave radio element 212 or two or more surfaces (e.g., to both user's hands, even from a single wearable radar-based gesture-recognition system 104), thereby allowing highly complex multi-hand gestures. These multi-hand gestures number in the many hundreds or even thousands for even one of the many sign languages currently in use.

Returning to FIG. 2, wearable radar-based gesture-recognition system 104 also includes a transmitting device configured to transmit gesture data to a remote device, though this may not be used when wearable radar-based gesture-recognition system 104 is integrated with wearable computing device 102. When included, gesture data can be provided in a format usable by remote computing device 108 sufficient for remote computing device 108 to determine the gesture in those cases where the gesture is not determined by wearable radar-based gesture-recognition system 104 or wearable computing device 102.

In more detail, microwave radio element 212 can be configured to emit microwave radiation in a 1 GHz to 300 GHz range, as well as a 3 GHz to 100 GHz range, to provide the localized radar field. This range affects antenna element 214's ability to sense interactions, such as to track locations of two or more targets to a resolution of about two to about 25 millimeters. Microwave radio element 212 can be configured, along with other entities of wearable radar-based gesture-recognition system 104, to have a relatively fast update rate, which can aid in resolution of the interactions.

By selecting particular frequencies, wearable radar-based gesture-recognition system 104 can operate to substantially penetrate clothing while not substantially penetrating human tissue. Further, antenna element 214 or signal processor 216 can be configured to differentiate between interactions in the localized radar field caused by clothing from those interactions in the localized radar field caused by human tissue. Thus, a wearer of wearable radar-based gesture-recognition system 104 may have a jacket or shirt covering microwave radio element 212 (or even embodying microwave radio element 212) and a glove covering one or more hands (e.g., right hand 404 making a gesture and left hand 406 over which the field is overlaid) but wearable radar-based gesture-recognition system 104 remains functional.

Wearable radar-based gesture-recognition system 104 may also include one or more system processors 220 and system media 222 (e.g., one or more computer-readable storage media). System media 222 includes system manager 224, which can perform various operations, including determining a gesture based on gesture data from signal processor 216, mapping the determined gesture to a pre-configured control gesture associated with a control input for an application associated with remote device 108, and causing transceiver 218 to transmit the control input to the remote device effective to enable control of the application. This is but one of the ways in which the above-mentioned control through wearable radar-based gesture-recognition system 104 can be enabled. Operations of system manager 224 are provided in greater detail as part of methods 1200 and 1300 below.

Figure 11:
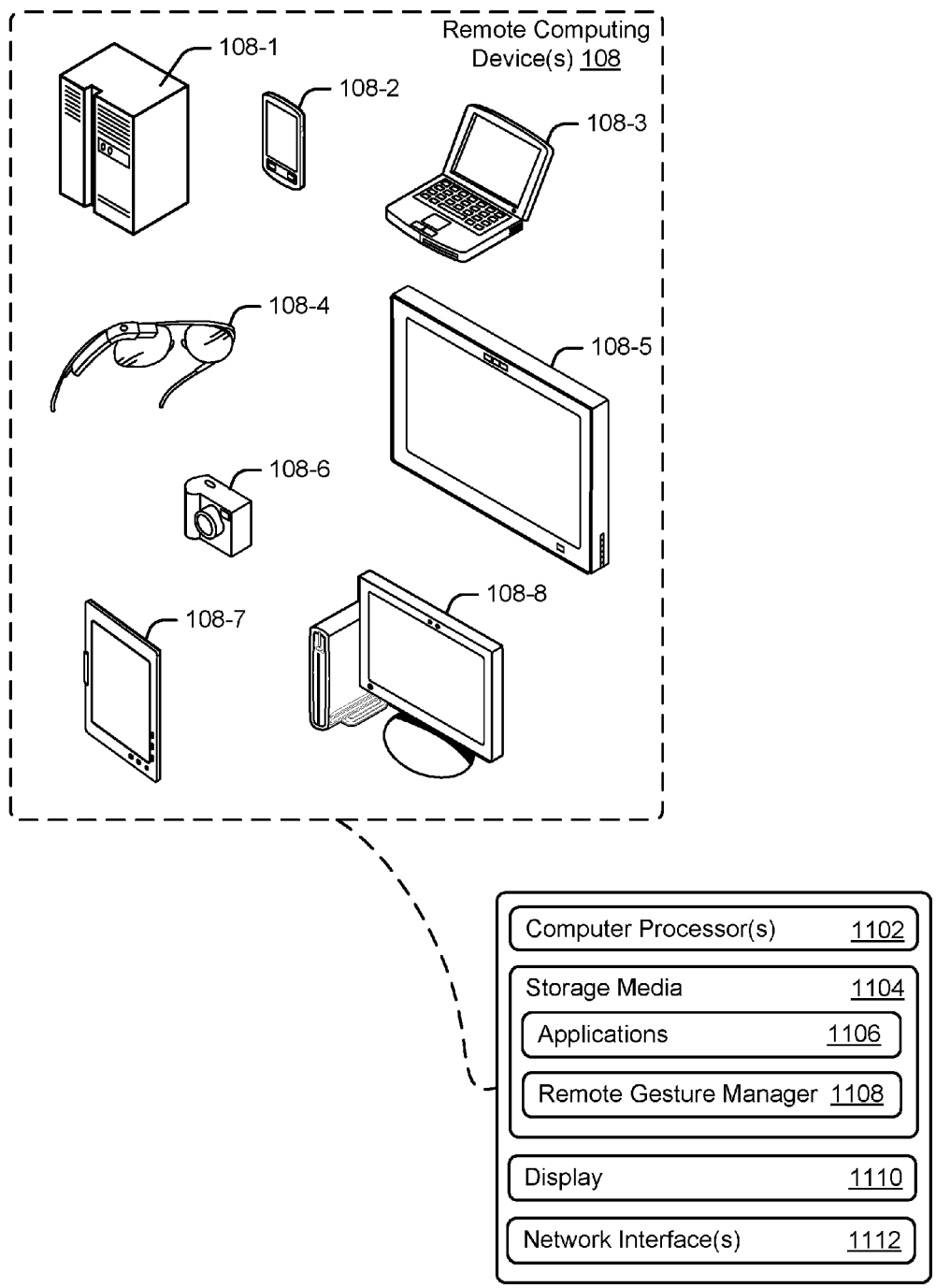
FIG. 11 illustrates an example remote computing device.

Returning to FIG. 1, consider remote computing device 108, which is illustrated in detail in FIG. 11. Remote computing device 108 includes one or more computer processors 1102 and computer-readable storage media (storage media) 1104. Storage media 1104 includes applications 1106 and/or an operating system (not shown) embodied as computer-readable instructions executable by computer processors 1102 to provide, in some cases, functionalities described herein. Storage media 1104 also includes remote gesture manager 1108 (described below).

Remote computing device 108 may also include a display 1110 and network interfaces 1112 for communicating data over wired, wireless, or optical networks. By way of example and not limitation, network interface 1112 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

Remote gesture manager 1108 is capable of interacting with applications 1106 and wearable radar-based gesture-recognition system 104 effective to aid, in some cases, control of applications 1106 through gestures received by wearable radar-based gesture-recognition system 104.

These and other capabilities and configurations, as well as ways in which entities of FIGS. 1-11 act and interact, are set forth in greater detail below. These entities may be further divided, combined, and so on. The environment 100 of FIG. 1 and the detailed illustrations of FIGS. 2-10 illustrate some of many possible environments and devices capable of employing the described techniques.

Example Methods

Figure 12:
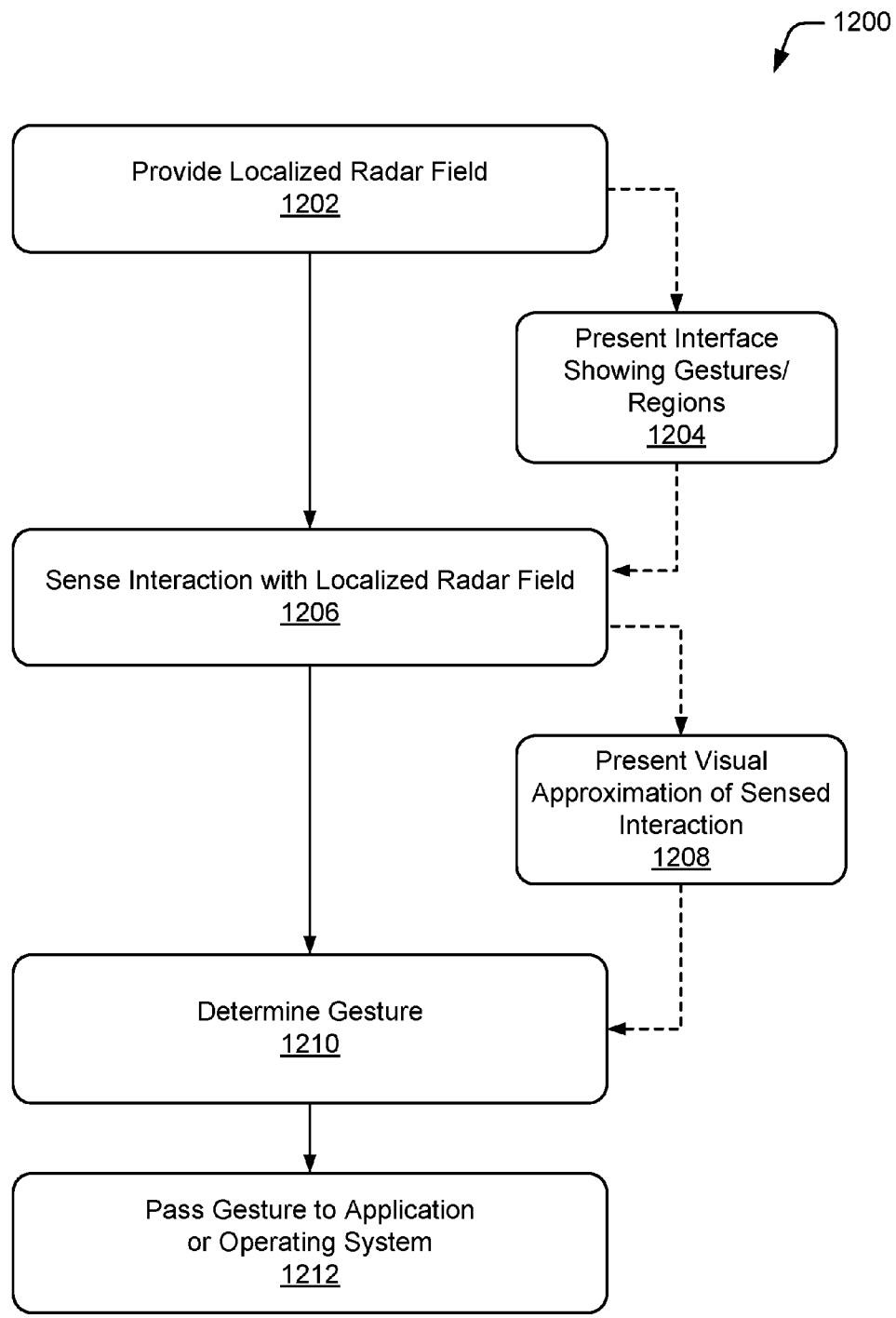
FIG. 12 illustrates example methods enabling use of a radar-based gesture-recognition through a wearable device.
Figure 13:
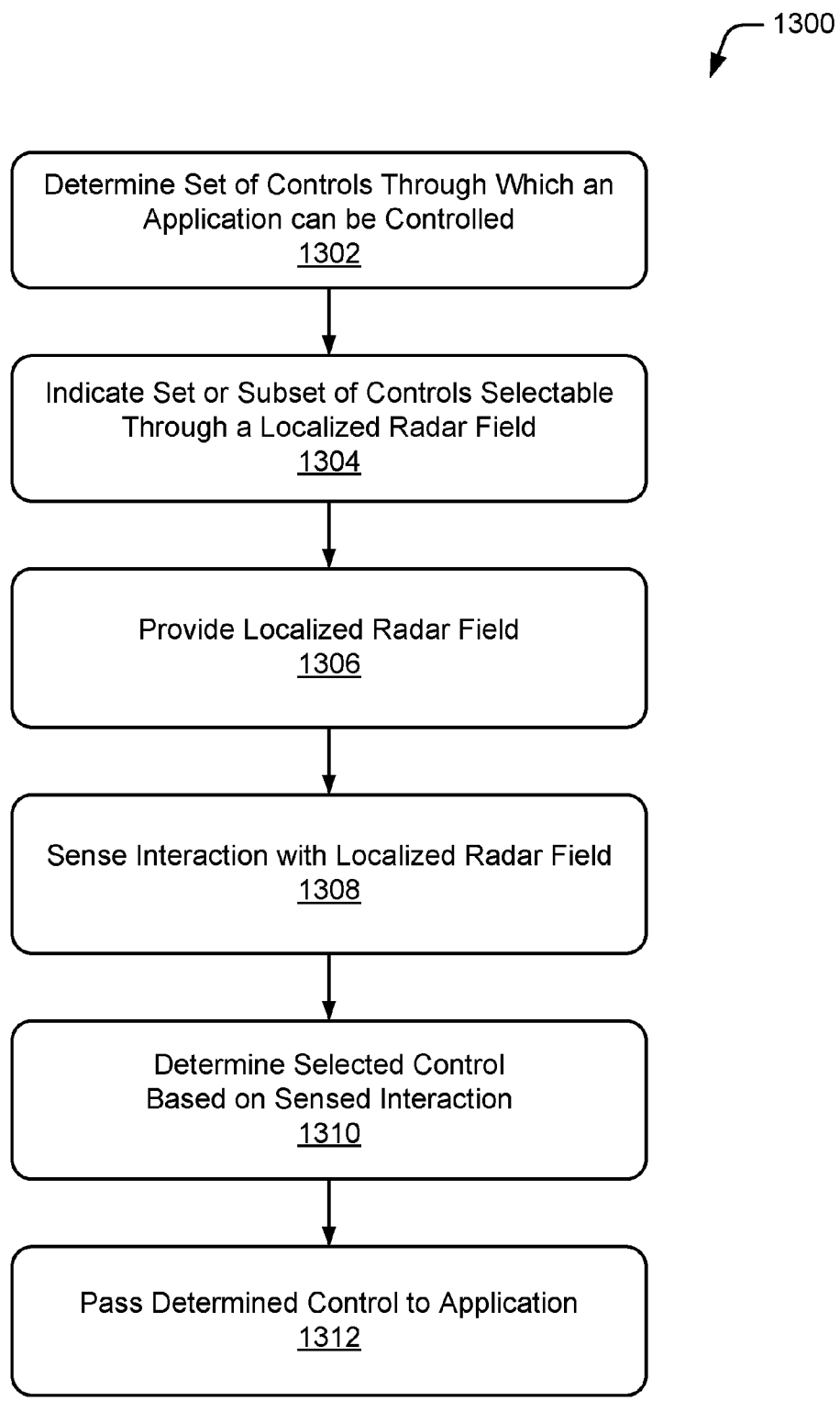
FIG. 13 illustrates methods enabling use of a radar-based gesture-recognition through a wearable device, including through particular controls for an application.

FIGS. 12 and 13 depict methods enabling radar-based gesture-recognition through a wearable device. These methods and other methods herein are shown as sets of blocks that specify operations performed but are not necessarily limited to the order or combinations shown for performing the operations by the respective blocks. In portions of the following discussion reference may be made to environment 100 of FIG. 1 and entities detailed in FIGS. 2-11, reference to which is made for example only. The techniques are not limited to performance by one entity or multiple entities operating on one device.

At 1202 a localized radar field is presented. This presentation of the localized radar field can be caused by one or more of gesture manager 206, system manager 224, signal processor 216, or remote gesture manager 1108. Thus, system manager 224 may cause microwave radio element 212 of wearable radar-based gesture-recognition system 104 to present (e.g., project or emit) one of the described localized radar fields noted above.

Methods 1200 may present, at 1204, an interface showing selectable control regions of the localized radar field or particular gestures, such as on display 210 or 1110 for wearable computing device 102 or remote computing device 108, respectively. A user may look at a display and see regions at which various regions select various inputs. Remote gesture manager 1108 may cause television 108-5, for example, to show particular gestures that, independent of particular regions, represent various selections, such as quick fan-out of thumb and fingers to mute the volume, or the noted localized radar field and in which regions of the field, such as to tap one region to pause the television and another to fast-forward the media being played.

At 1206, an interaction in the localized radar field is sensed. These interaction include the many noted above, such as a up-and-down fist to represent a "Yes" selection, a two-finger tap gesture, or a two-handed gesture, such as tapping opposing index, middle, and thumbs against each other through a plane or volume to represent an "eat" entry, as is the meaning in some sign languages.

Responsive to the sensed interaction, the techniques may, at 1208, present a visual approximation of a location and/or real-time movement corresponding to the sensed interaction. This can aid a user by providing a visual feedback, such as on display 110 of FIG. 1 to show an interaction with localized radar field 112.

At 1210, a gesture is determined based on the sensed interaction in the localized radar field. The sensed interaction can be processed by signal processor 216, which may provide gesture data for later determination as to the gesture intended, such as by system manager 224, gesture manager 206, or remote gesture manager 1108, as noted herein.

At 1212, the determined gesture is passed to an application or operating system effective to cause an application or operating system to receive an input corresponding to the determined gesture. Thus, a user may make a gesture to pause playback of media on a remote device and, at 1212, the gesture is passed effective to pause the playback. In some embodiments, therefore, wearable radar-based gesture-recognition system 104 and these techniques a universal controller for televisions, computers, appliances, and so forth.

In some cases, the techniques, when applying methods 1200 to a wearable computing device having the wearable radar-based gesture-recognition system, may also aid the user by showing an object on which the localized radar field overlays, such as a user's left hand or top surface of the user's left hand. The techniques may then present a visual approximation for the object on the display. Following this, and responsive to sensing an interaction in the localized radar field, the techniques present the sensed interaction at a location in the visual approximation for the object corresponding to the sensed interaction's location at the object's surface, similar to operation 1208.

FIG. 13 depicts methods 1300 enabling radar-based gesture-recognition through a wearable device, including through particular controls for an application.

At 1302, a set of controls through which the application can be controlled is determined. Gesture manager 206 or system manager 224, for example, can interact with applications on wearable computing device 102 or remote computing devices 108 to determine controls through which a user may interact with an application. Doing so may involve determining user interfaces through which an application is controlled, such as through inspection of the interface (e.g., visual controls), published APIs, and the like.

At 1304, the set or a subset of the controls selectable through a localized radar field are indicated. This can be through the application and the device on which the application is stored, e.g., on a laptop for a web browser, or on wearable computing device 102, such as to show a gesture usable to turn off the lights in a room.

At 1306, the localized radar field is provided. Thus, system manager 224 may cause microwave radio element 212 to present one of the various localized radar fields described herein.

At 1308, an interaction in the localized radar field is sensed, such as by antenna element 214. This is described in detail elsewhere herein.

At 1310, a control of the set or subset of the controls selected through the sensed interaction in the localized radar field is determined. This can be performed by signal processor 216 passing gesture data to various managers as noted herein.

At 1312, the determined control is passed to the application. Methods 1300 can be performed on a device remote from the radar-based gesture-recognition system, such as by remote gesture manager 1108. In this case remote gesture manager 1108 determines the set at 1302, indicates the controls on a remote display or causes the indication on display 110 or 210 of wearable computing device 102 and causes, at 1306, the localized radar field to be provided by communicating with wearable radar-based gesture-recognition system 104's transceiver 218. Remote gesture manager 1108 then receives gesture data for the interaction (which may be processed by signal processor 216), and, at 1310, determines based on the gesture data which control was selected before passing to the relevant application.

Operations of methods 1300 can be repeated, such as by determining for multiple other applications and other controls through which the multiple other applications can be controlled. Methods 1300 may then indicate various different controls to control various applications. In some cases, the techniques determine or assign unique and/or complex and three-dimensional controls to the different applications, thereby allowing a user to control numerous applications without having to select to switch control between them.

The preceding discussion describes methods relating to radar-based gesture-recognition through a wearable devices. Aspects of these methods may be implemented in hardware (e.g., fixed logic circuitry), firmware, software, manual processing, or any combination thereof. These techniques may be embodied on one or more of the entities shown in FIGS. 1-11 and 14 (computing system 1400 is described in FIG. 14 below), which may be further divided, combined, and so on. Thus, these figures illustrate some of the many possible systems or apparatuses capable of employing the described techniques. The entities of these figures generally represent software, firmware, hardware, whole devices or networks, or a combination thereof.

Example Computing System

Figure 14:
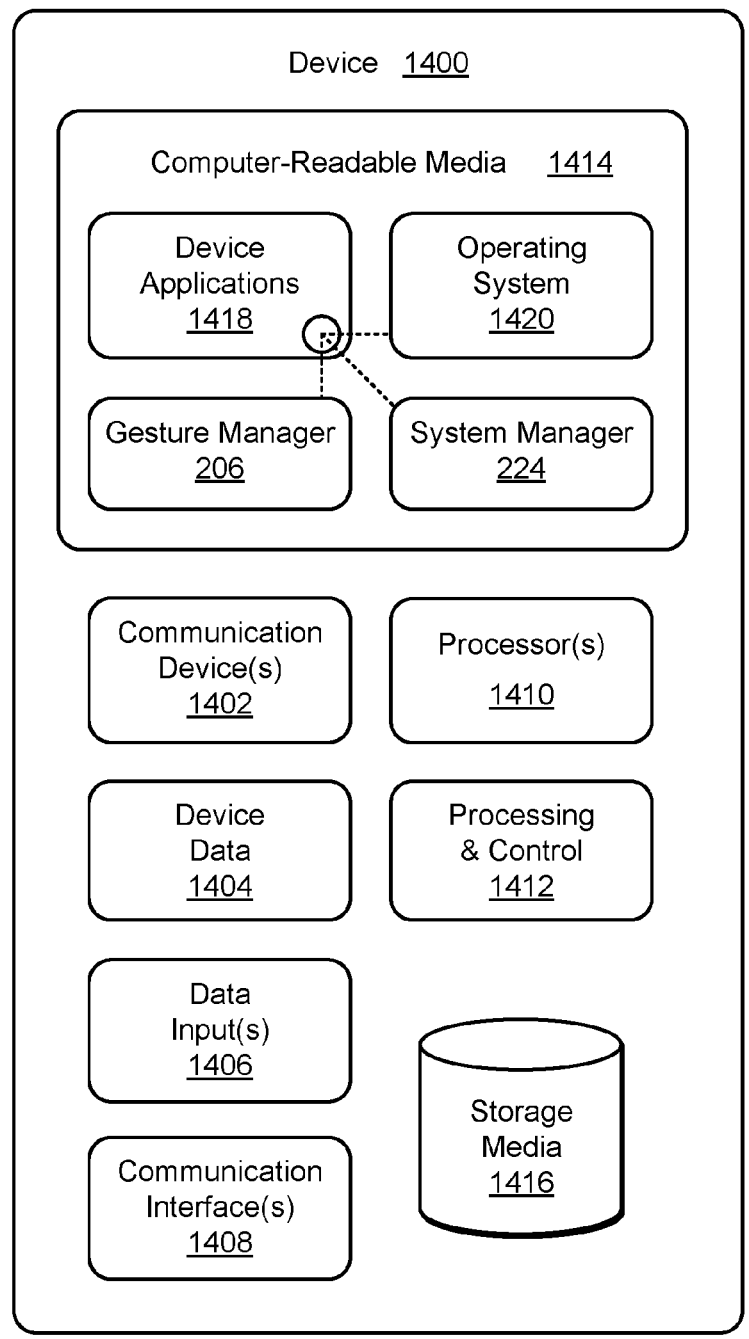
FIG. 14 illustrates an example device embodying, or in which techniques may be implemented that enable use of, a radar-based gesture-recognition through a wearable device.

FIG. 14 illustrates various components of example computing system 1400 that can be implemented as any type of client, server, and/or computing device as described with reference to the previous FIGS. 1-9 to implement a radar-based gesture-recognition through a wearable device. In embodiments, computing system 1400 can be implemented as one or a combination of a wired and/or wireless wearable device, System-on-Chip (SoC), and/or as another type of device or portion thereof. Computing system 1400 may also be associated with a user (e.g., a person) and/or an entity that operates the device such that a device describes logical devices that include users, software, firmware, and/or a combination of devices.

Computing system 1400 includes communication devices 1402 that enable wired and/or wireless communication of device data 1404 (e.g., received data, data that is being received, data scheduled for broadcast, data packets of the data, etc.). Device data 1404 or other device content can include configuration settings of the device, media content stored on the device, and/or information associated with a user of the device. Media content stored on computing system 1400 can include any type of audio, video, and/or image data. Computing system 1400 includes one or more data inputs 1406 via which any type of data, media content, and/or inputs can be received, such as human utterances, interactions with a localized radar field, user-selectable inputs (explicit or implicit), messages, music, television media content, recorded video content, and any other type of audio, video, and/or image data received from any content and/or data source.

Computing system 1400 also includes communication interfaces 1408, which can be implemented as any one or more of a serial and/or parallel interface, a wireless interface, any type of network interface, a modem, and as any other type of communication interface. Communication interfaces 1408 provide a connection and/or communication links between computing system 1400 and a communication network by which other electronic, computing, and communication devices communicate data with computing system 1400.

Computing system 1400 includes one or more processors 1410 (e.g., any of microprocessors, controllers, and the like), which process various computer-executable instructions to control the operation of computing system 1400 and to enable techniques for, or in which can be embodied, a radar-based gesture-recognition through a wearable device. Alternatively or in addition, computing system 1400 can be implemented with any one or combination of hardware, firmware, or fixed logic circuitry that is implemented in connection with processing and control circuits which are generally identified at 1412. Although not shown, computing system 1400 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 1400 also includes computer-readable media 1414, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Computing system 1400 can also include a mass storage media device 1416.

Computer-readable media 1414 provides data storage mechanisms to store device data 1404, as well as various device applications 1418 and any other types of information and/or data related to operational aspects of computing system 1400. For example, an operating system 1420 can be maintained as a computer application with computer-readable media 1414 and executed on processors 1410. Device applications 1418 may include a device manager, such as any form of a control application, software application, signal-processing and control module, code that is native to a particular device, a hardware abstraction layer for a particular device, and so on.

Device applications 1418 also include any system components, engines, or managers to implement radar-based gesture-recognition through a wearable device. In this example, device applications 1418 include gesture manager 206 and system manager 224.

CONCLUSION

Although embodiments of techniques using, and apparatuses including, radar-based gesture-recognition through a wearable device have been described in language specific to features and/or methods, it is to be understood that the subject of the appended claims is not necessarily limited to the specific features or methods described. Rather, the specific features and methods are disclosed as example implementations of radar-based gesture-recognition through a wearable device.

What is claimed is:

1. A computing bracelet comprising:
   a microwave radio element configured to provide a localized radar field adjacent the computing bracelet, the localized radar field comprising a surface radar field through which a gesture interaction is sensed, the surface radar field conforming to a surface of an object and the gesture interaction interrupting the surface radar field at or near the surface of the object;
   an antenna element configured to sense the gesture interaction through the surface radar field, the gesture interaction including multiple targets in the surface radar field, the multiple targets of the gesture interaction passing through the surface radar field;
   a signal processor configured to process the sensed gesture interaction including the multiple targets in the surface radar field sufficient to provide gesture data usable to determine a two-dimensional gesture or a three-dimensional gesture from the sensed gesture interaction including the multiple targets; and
   a display configured to present:
      an interface showing selectable control regions of the surface radar field; and
      a visual approximation, in real time, of a movement and a location corresponding to the sensed interaction, the visual approximation of the location indicating selection of one or more of the selectable control regions responsive to sensing the interaction in the surface radar field.

2. The computing bracelet as recited in claim 1, wherein the microwave radio element is configured to emit microwave radiation in a 3 GHz to 300 GHz range and the antenna element is configured to sense the gesture interaction of the emitted microwave radiation to track locations of two or more of the multiple targets to a resolution of approximately two to 25 millimeters, the resolution of the locations based on the 3 GHz to 300 GHz range of the emitted microwave radiation.

3. The computing bracelet as recited in claim 1, wherein the microwave radio element is configured to emit microwave radiation capable of substantially penetrating clothing and not substantially penetrating human tissue, and the antenna element or signal processor is configured to differentiate between gesture interactions in the surface radar field caused by clothing from gesture interactions in the surface radar field caused by human tissue.

4. The computing bracelet as recited in claim 1, wherein the microwave radio element is configured to emit continuously modulated radiation, ultrawideband radiation, or sub-millimeter-frequency radiation.

5. The computing bracelet as recited in claim 1, wherein the microwave radio element is configured to form emitted radiation in beams, the beams enabling the antenna element and the signal processor to determine which of the beams are interrupted.

6. The computing bracelet as recited in claim 1, wherein the surface of the object to which the surface radar field conforms is at least partially curved.

7. The computing bracelet as recited in claim 1, wherein the surface of the object to which the surface radar field conforms is planar.

8. The computing bracelet as recited in claim 1, wherein the surface radar field conforms to a human hand adjacent to the computing bracelet.

9. The computing bracelet as recited in claim 1, wherein the surface radar field conforms to a shirt-sleeve collar adjacent to the computing bracelet.

10. The computing bracelet as recited in claim 1, further comprising:
    one or more computer processors; and
    one or more computer-readable storage media having instructions stored thereon that, responsive to execution by the one or more computer processors, perform operations comprising:
    determining, based on the provided gesture data from the signal processor, the two-dimensional gesture or the three-dimensional gesture;
    mapping the determined two-dimensional gesture or the determined three-dimensional gesture to a pre-configured control gesture associated with a control input for an application associated with a remote device; and
    causing the transmitting device to transmit the control input to the remote device effective to enable control of the application.

11. A computer-implemented method comprising:
    determining, for an application on a computing bracelet, a set of controls through which the application can be controlled;
    indicating the set or a subset of the controls selectable through a localized radar field;
    causing a radar-based gesture-recognition system to present the localized radar field adjacent the radar-based gesture-recognition system, the localized radar field corresponding to a surface radar field through which a gesture interaction is sensed, the surface radar field conforming to a surface of an object and the gesture interaction interrupting the surface radar field at or near the surface of the object;

causing a display of the computing bracelet to present an interface showing the set or the subset of the controls selectable through the surface radar field;

causing the radar-based gesture-recognition system to sense the gesture interaction through the surface radar field, the gesture interaction including multiple targets in the surface radar field, the multiple targets of the gesture interaction passing through the surface radar field;

causing the display of the computing bracelet to present a visual approximation, in real time, of a movement and a location corresponding to the sensed interaction, the visual approximation of the location indicating selection of one or more of the set or the subset of the controls responsive to sensing the interaction in the surface radar field;

determining a control of the set or subset of the controls selected through the sensed gesture interaction in the surface radar field; and passing the determined control to the application.

12. The computer-implemented method as recited in claim 11, wherein the surface radar field conforms to a human hand adjacent to the computing bracelet or a shirt-sleeve collar adjacent to the computing bracelet.

13. The computer-implemented method as recited in claim 11, wherein the surface radar field to which the surface radar field conforms is at least partially curved.

14. The computer-implemented method as recited in claim 11, wherein the surface radar field to which the surface radar field conforms is planar.

15. A computing bracelet comprising:
a radar-based gesture-recognition system configured to sense gestures;
a display;
one or more computer processors; and
one or more computer-readable storage media having instructions stored thereon that, responsive to execution by the one or more computer processors, perform operations comprising:
causing the radar-based gesture-recognition system to provide a localized radar field adjacent the computing bracelet, the localized radar field corresponding to a surface radar field through which an interaction is sensed, the surface radar field conforming to a surface of an object and the gesture interaction interrupting the surface radar field at or near the surface of the object;

causing the radar-based gesture-recognition system to sense the interaction through the surface radar field, the interaction including multiple targets in the surface radar field, the multiple targets of the interaction passing through the surface radar field;

determining a two-dimensional gesture or a three-dimensional gesture based on the sensed interaction through the surface radar field;

passing the determined gesture to an application or operating system of the computing bracelet effective to cause the application or operating system to receive an input corresponding to the determined gesture; and causing the display to present:
an interface showing selectable control regions of the surface radar field; and
a visual approximation, in real time, of a movement and a location corresponding to the sensed interaction, the visual approximation of the location indicating selection of one or more of the selectable control regions responsive to sensing the interaction in the surface radar field.

16. The computing bracelet as recited in claim 15, wherein the operations further comprise:
determining the object to which the surface radar field conforms; and
presenting a visual approximation of the object on the display.

17. The computing bracelet as recited in claim 16, wherein the surface of the object to which the surface radar field conforms is at least partially curved.

18. The computing bracelet as recited in claim 16, wherein the surface of the object to which the surface radar field conforms is planar.

19. The computing bracelet as recited in claim 16, wherein the surface radar field conforms to a human hand adjacent to the computing bracelet.

20. The computing bracelet as recited in claim 16, wherein the surface radar field conforms to a shirt-sleeve collar adjacent to the computing bracelet.

* * * * *

UNITED STATES PATENT AND TRADEMARK OFFICE
CERTIFICATE OF CORRECTION

PATENT NO. : 9,971,415 B2  
APPLICATION NO. : 15/403066  
DATED : May 15, 2018  
INVENTOR(S) : Ivan Poupyrev and Gaetano Roberto Aiello Page 1 of 1

It is certified that error appears in the above-identified patent and that said Letters Patent is hereby corrected as shown below:

In the Claims

Column 12, Line 20, after "radiation," before "radiation," delete "ultrawideband" insert --ultra-wideband--

Signed and Sealed this  
Nineteenth Day of June, 2018

Andrei Iancu  
*Director of the United States Patent and Trademark Office*